(12) United States Patent
Singh

(10) Patent No.: US 11,736,429 B2
(45) Date of Patent: Aug. 22, 2023

(54) CONTEXTUAL TURNING OF DIALOG FROM ANY APP INTO ACTIONABLE WORKSPACE NOTIFICATION

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 175 days.

(21) Appl. No.: 17/084,996

(22) Filed: Oct. 30, 2020

(65) Prior Publication Data
US 2022/0141169 A1   May 5, 2022

(51) Int. Cl.
| | |
|---|---|
| *G06F 15/16* | (2006.01) |
| *H04L 51/224* | (2022.01) |
| *H04L 51/56* | (2022.01) |
| *H04L 67/55* | (2022.01) |
| *H04L 67/75* | (2022.01) |

(52) U.S. Cl.
CPC ............ *H04L 51/224* (2022.05); *H04L 51/56* (2022.05); *H04L 67/55* (2022.05); *H04L 67/75* (2022.05)

(58) Field of Classification Search
CPC ......... H04L 51/24; H04L 51/36; H04L 67/26; H04L 67/36
See application file for complete search history.

(56) References Cited

U.S. PATENT DOCUMENTS

| | | | | |
|---|---|---|---|---|
| 5,937,159 A | * | 8/1999 | Meyers | .................. G06F 21/31 726/20 |
| 9,872,223 B1 | * | 1/2018 | Cudak | .................. H04W 4/029 |
| 2014/0149538 A1 | | 5/2014 | Deeter et al. | |
| 2014/0173026 A1 | | 6/2014 | Buck et al. | |
| 2015/0373089 A1 | | 12/2015 | Koss et al. | |
| 2018/0091456 A1 | * | 3/2018 | Weinberg | ................ H04L 51/24 |
| 2020/0327005 A1 | | 10/2020 | Singh et al. | |
| 2020/0327008 A1 | | 10/2020 | Singh et al. | |

OTHER PUBLICATIONS

International Search Report and Written Opinion for Application No. PCT/US2021/056940, dated Feb. 18, 2022, 11 pages.

* cited by examiner

*Primary Examiner* — John B Walsh

(57) ABSTRACT

Systems and methods including notification techniques for sharing information related to detected dialogs on secondary computing devices associated with a user are provided. For example, a system can include a user interface (UI) monitor on a first client computing device configured to detect a dialog and send an indication of the dialog to a workspace backend. The workspace backend can facilitate communication between the first client computing device and one or more secondary computing devices associated with the user such that the user receives notifications of dialogs displayed on the first client computing device on the one or more secondary computing devices. The user has the option of responding to the dialog on a secondary computing device, and the workspace backend facilitates transmission of the user response on the secondary computing device back to the first client computing device.

16 Claims, 14 Drawing Sheets

CONTEXTUAL TURNING OF DIALOG FROM ANY APP INTO ACTIONABLE WORKSPACE NOTIFICATION

BACKGROUND

Access to remote resources such as remotely accessible applications generally requires limiting instantaneous access to a single user to prevent multiple users from accessing the same resources at the same time. In many examples, users tend to use a similar set of applications on multiple devices and, as such, may be accessing similar distributed resources. However, when accessing a particular resource or otherwise performing a particular operation, a user may step away from their desk or otherwise miss a notification related to the operation. Missing such a notification can delay completion of the operation, cause a loss of work, lower overall productivity, and/or prevent other users from accessing one or more resources until the operation is complete if, for example, access to the one or more resources or completion of another user's task is dependent upon the delayed and/or uncompleted operation.

SUMMARY

In at least one example, a system for monitoring for and providing notification of application dialogs is provided. The system includes a client computing device that includes a memory and at least one processor coupled to the memory. The at least one processor is configured to display UI data from an application, detect, within the UI data, a dialog to display in the application, extract dialog details regarding the dialog from the UI data, transmit the dialog details to a server, receive a response to the dialog from the server, and respond to the dialog based on the response to the dialog from the server.

Implementations of the system can include one or more of the following features.

In the system, to detect the dialog can include the at least one processor being further configured to identify changes in the UI data, the changes including changes in text to display in the application, changes in images to display in the application, a new window to display in the application, and/or one or more user-selectable response options to display in the application.

In the system, the dialog can include at least one of information related to operation of at least one user-initiated process being completed by the server or information related to an idle session termination warning. In some examples, the at least one user-initiated process can include a process configured to manipulate at least one resource such that one or more operations relating to a distributed computing environment are inaccessible to other users of the distributed computing environment until completion of the at least one user-initiated process.

In the system, the client computing device can be a first client computing device, the memory can be a first memory, the at least one processor can be at least one first processor, and the system further can include the server, the server further including a second memory and at least one second processor coupled to the second memory and configured to receive the dialog details from the first client computing device, extract details related to a user of the first client computing device from the dialog details, determine at least one second client computing device associated with the user of the first client computing device, and transmit a notification including at least a portion of the dialog details to the at least one second client computing device. In some examples, the at least one second processor can further ne configured to receive a notification response from the second client computing device, generate the response to the dialog based upon the notification response, and transmit the response to the dialog to the first client computing device. In some examples, the system can further include the at least one second client computing device, the at least one second client computing device including a third memory and at least one third processor coupled to the third memory and configured to receive the notification from the server, display at least a portion of the notification, receive a response to the at least a portion of the notification from a user of the first client computing device, and transmit a notification response to the server.

In another example, a method of monitoring for and providing notification of application dialogs is provided. The method includes displaying, by a client computing device, UI data from an application; detecting, within the UI data by the client computing device, a dialog to display in the application; extracting, by the client computing device, dialog details regarding the dialog from the UI data; transmitting, by the client computing device, the dialog details to a server; receiving, by the client computing device, a response to the dialog from the server; and responding, by the client computing device, to the dialog based on the response to the dialog from the server.

Implementations of the method of monitoring for and providing notification of application dialogs can include one or more of the following features.

In the method, detecting the dialog can include identifying changes in the UI data, the changes including changes in text to display in the application, changes in images to display in the application, a new window to display in the application, and/or one or more user-selectable response options to display in the application.

In the method, detecting the dialog can include detecting information related to at least one or operation of at least one user-initiated process being completed by the server or information related to an idle session termination warning. In some examples, the method can further include initiating the operation of the at least one user-initiated process, wherein the at least one user-initiated process includes a process configured to manipulate at least one resource such that one or more operations relating to a distributed workspace are inaccessible to other users of the distributed workspace until completion of the at least one user-initiated process.

In the method, the client computing device can be a first client computing device and the method can further include receiving, by the server, the dialog details from the first client computing device; extracting, by the server, details related to a user of the first client computing device from the dialog details; determining, by the server, at least one second client computing device associated with the user of the first client computing device; and transmitting, by the server, a notification including at least a portion of the dialog details to the at least one second client computing device. In some examples, the method can further include receiving, by the server, a notification response from the second client computing device; generating, by the server, the response to the dialog details based upon the notification response; and transmitting, by the server, the response to the dialog details to the first client computing device. In some examples, the method can further includes receiving, by the second client computing device, the notification from the server; displaying, by the second client computing device, at least a portion of the notification; receiving, by the second client computing device, a response to the at least a portion of the notification from a user of the first client computing device; and transmitting, by the second client computing device, a notification response to the server.

In another example, a non-transitory computer-readable medium storing computer-executable instructions to implement a process of monitoring for and providing notification of application dialogs is provided. The instructions can include instructions to display user interface (UI) data from an application, detect a dialog to display in the application, extract dialog details regarding the dialog from the UI data, transmit the dialog details to a server, receive a response to the dialog from the server, and respond to the dialog based on the response to the dialog from the server.

Implementations of the computer readable medium can include one or more of the following features.

In examples of the computer-readable medium, the instructions to detect the dialog can include instructions to identify changes in the UI data, the changes including changes in text to display in the application, changes in images to display in the application, a new window to display in the application, and/or one or more user-selectable response options to display in the application.

In examples of the computer-readable medium, the instructions to detect the dialog can include instructions to detect information related to at least one of operation of at least one user-initiated process being completed by the server or information related to an idle session termination warning. In some examples, the instructions to detect information related to the operation of the of at least one user-initiated process can include instructions to detect a process configured to manipulate at least one resource such that one or more operations related to a distributed computing environment are inaccessible to other users of the distributed computing environment until completion of the at least one user-initiated process.

In examples of the computer-readable medium of claim 15, wherein the instructions can further include instructions to receive a notification from the server, display at least a portion of the notification, receive a response to the at least a portion of the notification from a user, and transmit a notification response to the server. In some examples, the instructions can further include instructions to receive the notification response from the server, process the notification response to generate a processed notification, and generate a response to the dialog based upon the processed notification.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
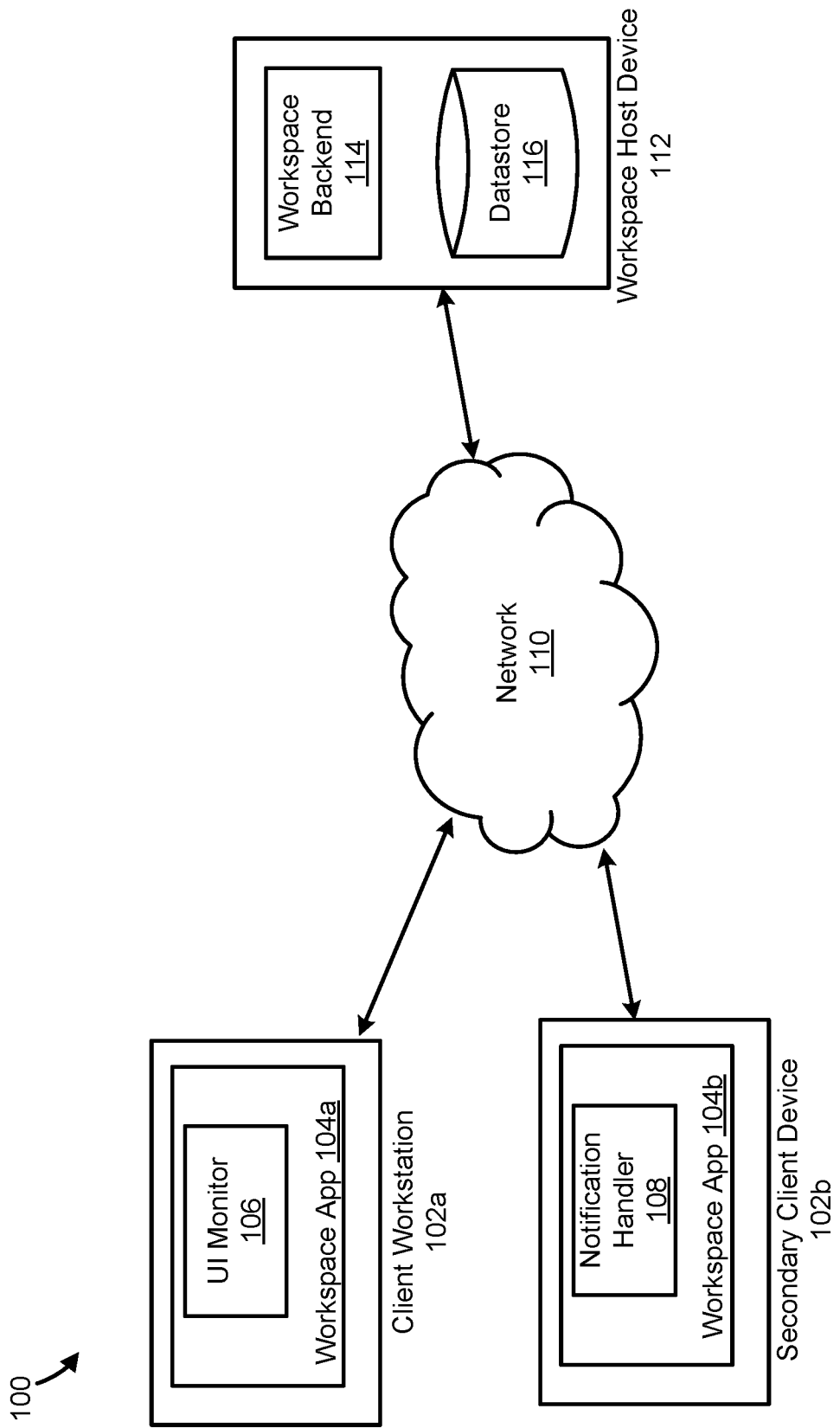
FIG. 1 is a block diagram of a system architecture for accessing a distributed workspace by multiple client devices.

As summarized above, various examples described herein are directed to systems and methods for monitoring for application dialogs on a first client computing device and, absent a response to the dialog on the first client computing device, providing a notification of the dialog to a second client computing device associated with the user of the first client computing device. For example, the systems and methods as described herein include a workspace backend that communicates with, for example, a client agent running on the first client computing device. The workspace backend can be configured to provide the first client device with access to one or more distributed applications accessible as, for example, a workspace application, a web-based application, software as a service (SaaS) applications, and other similar distributed applications. It should be noted that, as used herein, workspace application can include an application launched and running on the first client computing device and configured to be accessible to the user of the first client computing device include, for example, distributed applications as described above, local applications, proprietary applications, shared applications, and other similar application types.

The first client computing device can include a user interface (UI) monitor that is configured to monitor for changes to the user interface being displayed in the workspace application. For example, the UI monitor can be configured to detect a new dialog displayed within the workspace application. In some examples the new dialog can include a query or other similar user alert that may interrupt operation of one or more processes until a response is received from the user. In such an example, if the user does not respond in a timely manner, the operation of the one or more processes can be held indefinitely. If the one or more processes were accessing shared resources that should otherwise be available to other users, access to the resources by those users may be prevented until completion of the one or more processes. In some examples, due to an interrupted or non-completed operation by the user of the first client computing device, one or more other users may be prevented from starting or completing their operations even if the resources being accessed by the interrupted or non-completed operation are not shared resources. As such, in this example, a user's inability to respond to a dialog concerning the operation may directly impact other users' abilities to interact with a distributed workspace and its associated resources.

Additionally, a new dialog may be directly related to a lack of user input or action. For example, the workspace application can include an idle time that, after a certain period of inactivity, provides a notification to a user that their session will be terminated if they do not affirmatively respond that they wish to continue their session. In such an example, termination of a session due to user inactivity can also result in the termination of the operation of one or more processes involving shared resources. In some examples, termination of a session due to user inactivity can further result in data loss or corruption depending upon what type of operation is interrupted due to termination of the user session. In this example, as before, access to resources may be limited for other users, or particular operations such as updating or copying files may be halted, resulting in the versions of shared resources available to other users being outdated or otherwise incomplete.

To improve a user's experience with a distributed workspace environment as described herein, the systems and methods as disclosed below include notification techniques for sharing information related to detected dialogs on secondary computing devices associated with a user. For example, the UI monitor on a first client computing device can detect a dialog and send an indication of the dialog to a workspace backend. The workspace backend can then facilitate communication between the first client computing device and one or more secondary computing devices associated with the user such that the user receives notifications of dialogs displayed on the first client computing device on the one or more secondary computing devices. The user then has the option of responding to the dialog on a secondary computing device, and the workspace backend facilitates transmission of the user response on the secondary computing device back to the first client computing device.

In some examples, the notification of the dialog can be provided on the first client device such that the user is made aware of the dialog. For example, if the user is interacting with a tab-based browser and a dialog is display in a non-active or otherwise unselected tab, the notification can include an indication of what tab the dialog is provided in. In some examples, the tab including the dialog can be propagated to the active tab in the browser for display to the user. A similar technique can be used in a window-based browser or workspace. If a dialog is detected in a non-active or unselected window, the notification can include an indication of what window the dialog is provided in and, in some examples, the window with the dialog can be propagated to the front of the workspace as the active window for display to the user.

Thus, and in accordance with at least some examples disclosed herein, dialog monitoring and notification systems and methods are provided that include improved communication of dialog details and information to a user at multiple client computing devices owned by or otherwise assigned to the same user. These systems and methods enhance the quality of a user's experience by minimizing the risk of interrupting or otherwise halting operation of one or more processes or tasks due to non-responsiveness of the user at any one particular computing device.

In some examples, a system for monitoring for and providing notification of application dialogs includes a first client computing device. The first client computing device includes at least one first processor configured to monitor UI data displayed in a workspace application. In some examples, the UI data is associated with and displayed by one or more applications being run on the first client device and/or a client host associated with the first client device. Data associated with the applications can be received from, for example, a workspace backend if the application is a distributed application such as a web-based application or an SaaS application, or from a locally stored and run application. The at least one first processor can be further configured to determine changes in the UI data and compare the determined changes in the UI data to dialog characteristics to determine if the changes indicate dialog information displayed in the workspace application. The at least one first processor can be further configured to extract dialog details from the dialog information if the changes indicate dialog information displayed in the workspace application, transmit the dialog details to the workspace backend, receive a response to the transmitted dialog details from the workspace backend, and process the received response to respond to the dialog information displayed in the workspace application. In additional examples, the system further includes a workspace host device configured to host the workspace backend and process the dialog details to direct a notification to a second client computing device. In some additional examples, the system further includes the second client computing device that is configured to process the notification and provide a user response to the detected dialog.

Examples of the methods, systems, and processes discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Sample Computing Systems

In some examples, a distributed system is configured to implement workspace and system access to remote users, thereby providing a central repository of applications, files, and other similar resources to a group of trusted users accessible via, for example, an enterprise service. A digital workspace can be implemented as a software framework designed to deliver and manage a user's applications, data, and desktops in a consistent and secure manner, regardless of the user's device or location. Digital workspaces enhance the user experience by streamlining and automating those tasks that a user performs frequently, such as approving expense reports, confirming calendar appointments, submitting helpdesk tickets, and reviewing vacation requests. A digital workspace allows users to access functionality provided by multiple enterprise applications—including SaaS applications, web applications, desktop applications, and proprietary applications—through a single interface.

FIG. 1 illustrates a logical architecture of one implementation of, for example, a distributed workspace system 100 that is configured to connect one or more client computing devices with one or more remote computing devices configured to host shared resources such as applications accessible via the distributed workspace. As shown in FIG. 1, the system 100 can include a client workstation 102a and a secondary client device 102b. In certain implementations, each of the client devices 102a and 102b can belong to or otherwise be assigned to the same user. For example, as shown in FIG. 1, client device 102a can be a user's desktop computer and secondary client device 102b can be a mobile device owned by or otherwise assigned to the user.

As further shown in FIG. 1, each of client devices 102a and 102b can include a workspace application 104a and 104b respectively, herein collectively referred to as workspace application 104. The workspace application 104 can be configured to provide an interface to facilitate remote access to one or more resources hosted at or by, for example, a remote computing device such as workspace host device 112. In certain implementations, the client devices 102a and 102b can be operably connected to the remote computing device via one or more networks 110. In some examples, the network 110 can be a wired network, a wireless network, or a combination of both wired and wireless networks. As shown in FIG. 1, each of client devices 102a and 102b are operably connected to the workspace host device 112 via network 110.

In some examples, the workspace host device 112 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, the workspace host device 112 can execute a remote presentation services program or other program that uses a thin client or a remote-display protocol to capture display output generated by an application executing on the remote computing device and transmit the application display output to the client devices 102a and 102b for presentation to one or more device users.

In some examples, the workspace host device 112 can include a server agent that is configured to communicate with the workspace application 104. The server agent can be configured to, for example, authenticate a client device, provide secure access to one or more remote and/or shared resources, monitor user interactions with the resources, update user access based upon changes to user permission levels for a client device, distribute or properly direct requests to available resources, and perform other similar distributed workspace functions.

In yet other examples, the workspace host device 112 can be configured to execute a virtual machine providing, to a user of one of client devices 102a and/or 102b, access to a computing environment. The virtual machine can be managed by, for example, a hypervisor, a virtual machine manager (VMM), or any other hardware virtualization technique within the workspace host device 112.

In some examples, the network 110 can be: a local area network (LAN); a metropolitan area network (MAN); a wide area network (WAN); a primary public network; and a primary private network. Additional examples can include a network 110 of mobile telephone networks that use various protocols to communicate among mobile devices. For short range communications within a wireless local-area network (WLAN), the protocols can include 802.11, Bluetooth, and Near Field Communication (NFC).

It should be noted that the specific device architecture as shown in FIG. 1 is provided by way of example only. For instance, two client devices 102a and 102b are provided by way of example only and system 100 can include additional client devices. In certain implementations, multiple remote computing devices can be operably connected to the client devices via, for example, one or more network appliances configured to perform, for example, access control and load balancing. Additional network examples and associated devices are described below in the discussion of FIG. 6.

In a typical distributed workspace or remote resource system, a user can receive one or more notifications related to the user's access or a task the user is trying to complete. For example, as further shown in FIG. 1, a user of client workstation 102a can access the workspace host device 112 to perform one or more functions such as file access and copying. In such an example, a workspace backend 114 can monitor the activity of the user's interactions with the workspace application 104a such as, for example, user requests to access information stored on datastore 116. During access, one or more notifications or alerts can be provided to the user of workspace application 104a. For example, the user can request that a set of files be copied from one location to another within, for example datastore 116. While processing the request, the workspace backend 114 can determine an error associated with the request. For example, the user may not have permission to copy the files, the files may already exist in the target location, the files are being accessed by another user, or another similar error. In such an example, the workspace backend 114 can provide an error message to the user via workspace application 104a. Additionally, upon issuing an error message or other similar dialog to the user, the workspace backend 114 can also halt a process initiated by the user. For example, if the user was copying or otherwise altering a file and the workspace backend 114 issues an error message or other similar dialog associated with that process, the workspace backend 114 can also halt the process. In such an example, if additional users are waiting to access the copied materials, their access may be delayed until the requesting user addresses the error message or dialog. Similarly, if a user is accessing a resource such as a specific file in a distributed workspace, and the user closes the resource, the workspace backend 114 can present the user with a dialog regarding saving any changes to the resource prior to closing. If the user does not see the new dialog, and moves onto another task, the resource may remain unavailable to additional users as the original user still has not fully ceased their access to the resource.

In additional examples, the workspace backend 114 can implement a security feature to prevent unauthorized access to the distributed workspace via a computing device that has been signed into the distributed workspace but then left idle for a period of time. For example, if the workspace backend 114 determines that a device such as the client workstation 102a has been idle for a particular period of time such as five minutes, the workspace backend 114 can transmit a message to the client workstation including a dialog indicating that the distributed workspace session will be closed if the user does not affirmatively respond to continue the session in a certain amount of time (e.g., within an additional five minutes). The displayed dialog in the workspace application 104*a* can include a timer counting down to the end of the session. In such an example, if the user of the workspace application 104*a* has any particular processes running such as file copying, resource editing such as digital rendering of audio/video files, and other similar processes, the processes can be interrupted as a result of the session being closed. Similar to above, if additional users are waiting to access the resources being processed, access may be denied or otherwise restricted as a result of the session being closed. In some examples, additional users may not receive updated files, data, and/or content if original user's session terminates without their work being properly saved.

Figure 2:
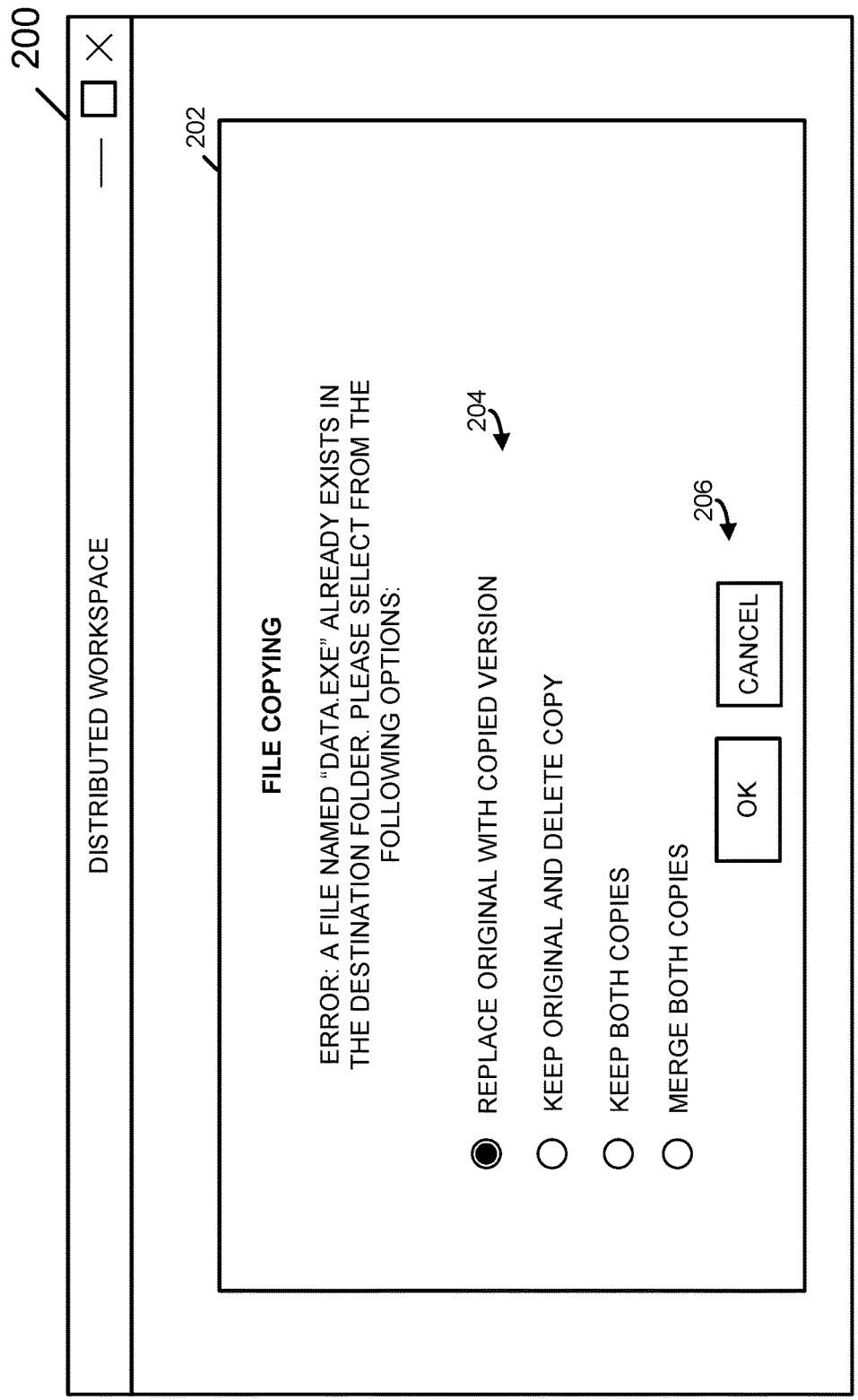
FIG. 2 is a screenshot of a dialog presented on a first client computing device in accordance with an example of the present disclosure.

For example, as shown in FIG. 2, the user was attempting to copy a set of files from one location to another. FIG. 2 illustrates a sample view of a user interface screen 200 that is displayed on a client computing device such as, for example, client workstation 102*a* as shown in FIG. 1 and described above and displayed by a workspace application such as, for example, workspace application 104*a*.

As illustrated in FIG. 2, the screen 200 includes user interface controls 202, 204, and 206. In certain implementations, the control 202 can be configured to display text or other similar information to a user as a dialog as described herein. For example, as shown in FIG. 2, the control 202 can include information relating to a file copying process initiated by the user of the client computing device. As shown in FIG. 2, the control 202 also includes text indicating that there has been an error during the copying process.

As further shown in FIG. 2, the control 202 can include the control 204. The control 204 can include an option for the user to provide a selection of how to proceed or otherwise handle the identified error. For example, as shown in FIG. 2, the control 204 can include a set of user-selectable options regarding the user's preference for handling the error identified in the dialog. As further shown in FIG. 2, the control 202 can include the control 206. The control 206 can include an option for the user to accept the option selected above in the control 204 or to cancel the entire process.

As described herein, a dialog detected on a first client computing device can be identified and processed for display on a second client computing device. As such, FIG. 3A illustrates a sample view of a user interface screen 300 that is displayed on a second client computing device such as secondary computing device 102*b* as shown in FIG. 1 and described above and displayed by a workspace application such as, for example, workspace application 104*b*.

Figure 3A:
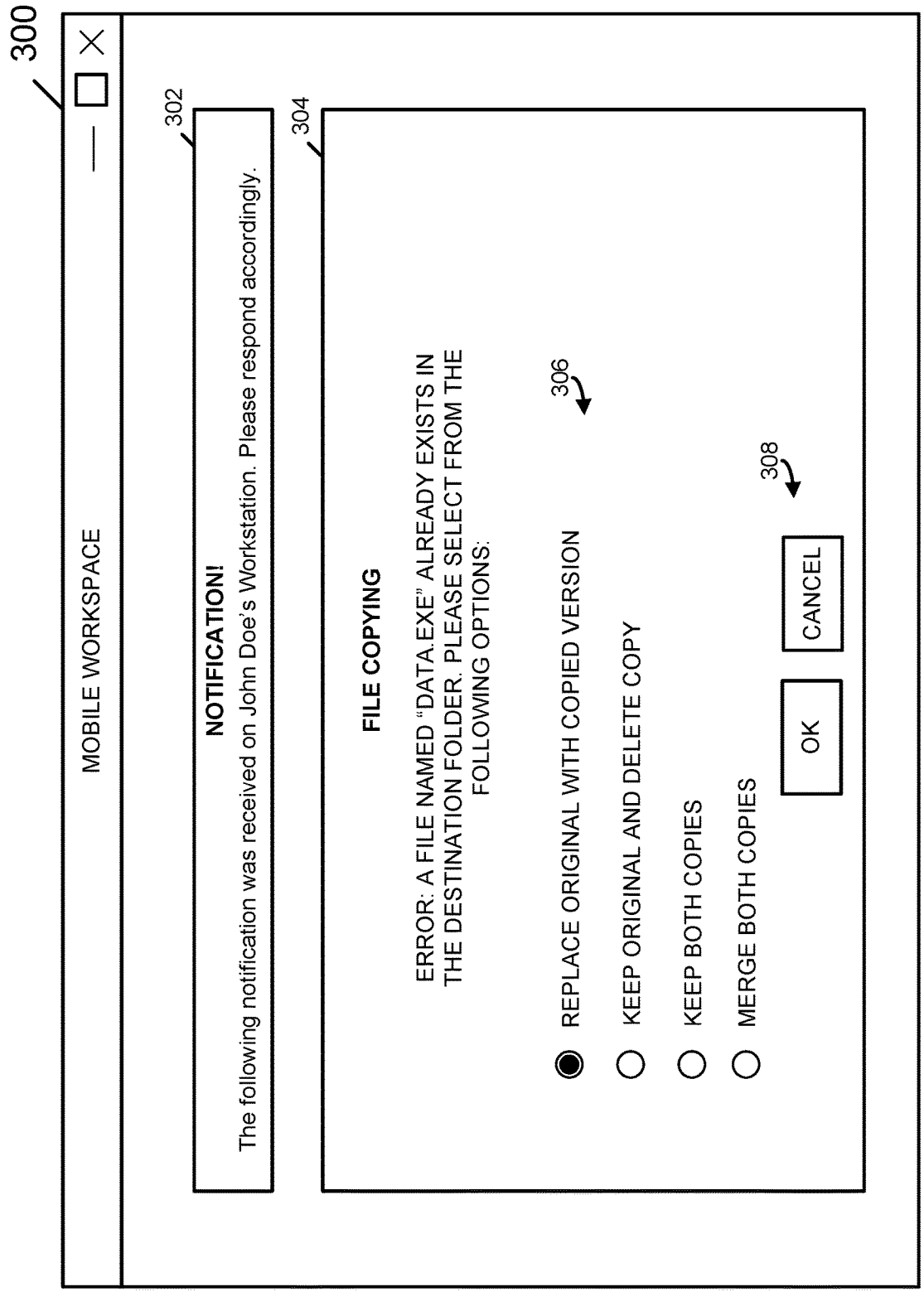
FIGS. 3A and 3B are screenshots of notifications presented on a secondary client computing device in accordance with an example of the present disclosure.

As illustrated in FIG. 3A, the screen 300 includes user interface controls 302, 304, 306, and 308. In certain implementations, the control 302 can be configured to display text or other similar information to a user indicating the origin of the dialog information being displayed in screen 300. For example, as shown in FIG. 3A, the control 302 can include information indicating that the notification is related to dialog information received on another computing device associated with the user. In some examples, the control 302 can include additional information such as the name of the application displaying the dialog, the title of the window or tab displaying the dialog, additional visual information such as an icon or other graphical representation of the application/window/tab displaying the dialog, and other similar information designed and presented to provide the user with a more robust interface with which to interpret and respond to notifications and/or dialogs.

As further shown in FIG. 3A, the control 304 can display information relating to a file copying process initiated by the user of the client computing device, similar to the information as shown in control 202 of FIG. 2 and described above. As shown in FIG. 3A, the control 304 also includes text indicating that there has been an error during the copying process.

As further shown in FIG. 3A, the control 304 can include the control 306. The control 306 can include an option for the user to provide a selection of how to proceed or otherwise handle the identified error, mirroring the options as provided in the control 204 as shown in FIG. 2 and described above. For example, as shown in FIG. 3A, the control 306 can include a set of user-selectable options regarding the user's preference for handling the error identified in the dialog. As further shown in FIG. 3A, the control 304 can include the control 308. The control 308 can include an option for the user to accept the option selected above in the control 306 or to cancel the entire process.

Figure 3B:
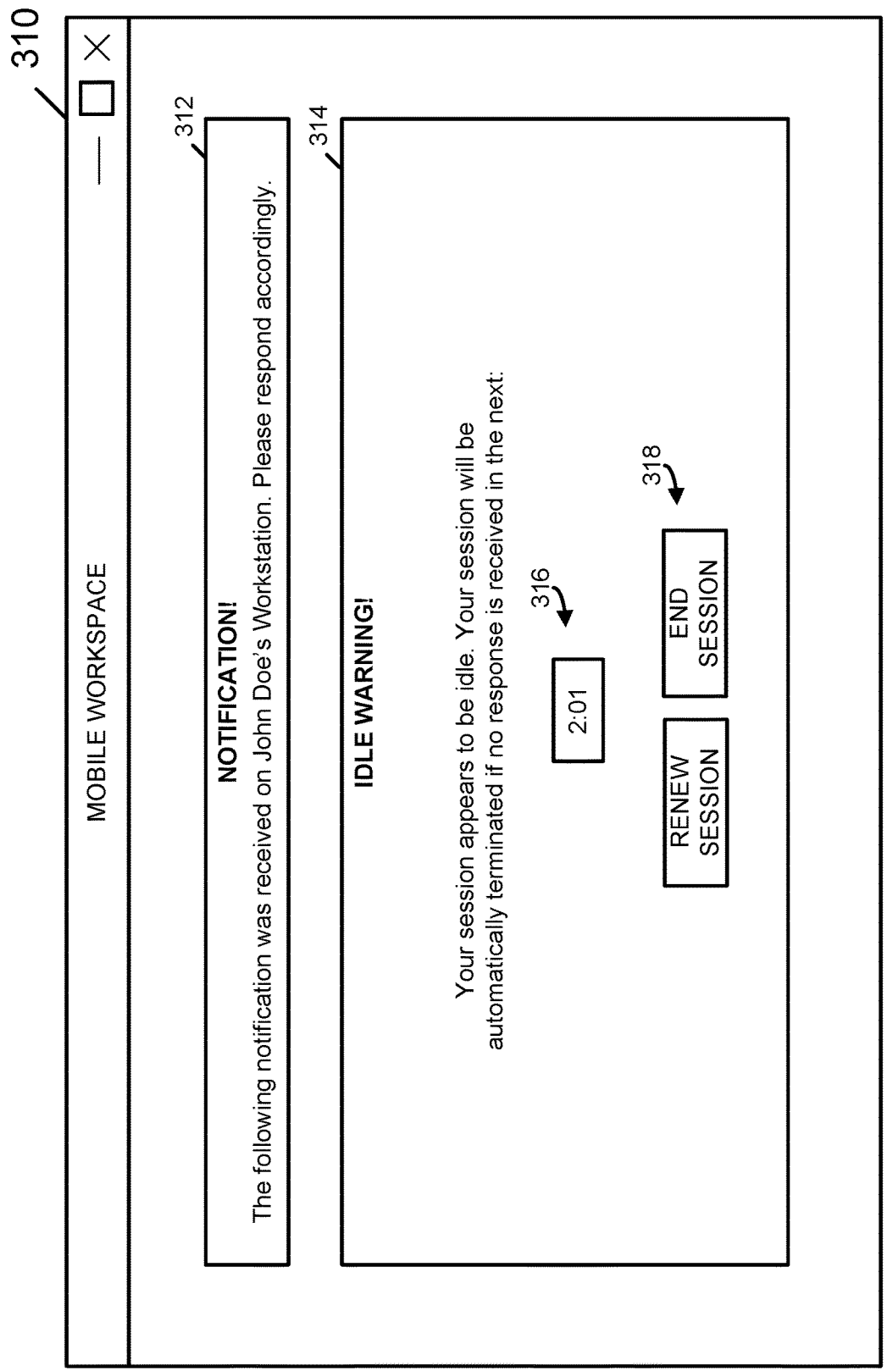

Additionally, as described herein, a dialog detected on a first client computing device can include a dynamic component such as a timer counting down to zero. For example, if the dialog is an indication that the user has been idle for a particular period of time, the dialog may include a timer counting down to a time when the user session will be terminated. FIG. 3B illustrates a sample view of a user interface screen 310 that is displayed on a second client computing device such as secondary computing device 102*b* as shown in FIG. 1 and described above and displayed by a workspace application such as, for example, workspace application 104*b*. In this example, a user has received an idle warning on their first client computing device and a similar notification has been sent to the secondary client computing device and displayed in screen 310.

As illustrated in FIG. 3B, the screen 310 includes user interface controls 312, 314, 316, and 318. In certain implementations, the control 312 can be configured to display text or other similar information to a user indicating the origin of the dialog information being displayed in screen 310. For example, as shown in FIG. 3B, the control 312 can include information indicating that the notification is related to dialog information received on another computing device associated with the user.

As further shown in FIG. 3B, the control 314 can display information relating to a idle warning that includes information indicating that the user's session appears to be idle and information that the session will be terminated if no response is received within a certain amount of time. As shown in FIG. 3B, the control 314 also includes a dynamic control element 316 that includes a timer counting down to the automatic termination of the user's session. As further shown in FIG. 3B, the control 314 can include the control 318. The control 318 can include an option for the user to renew the session or to proactively end the session.

Figure 4:
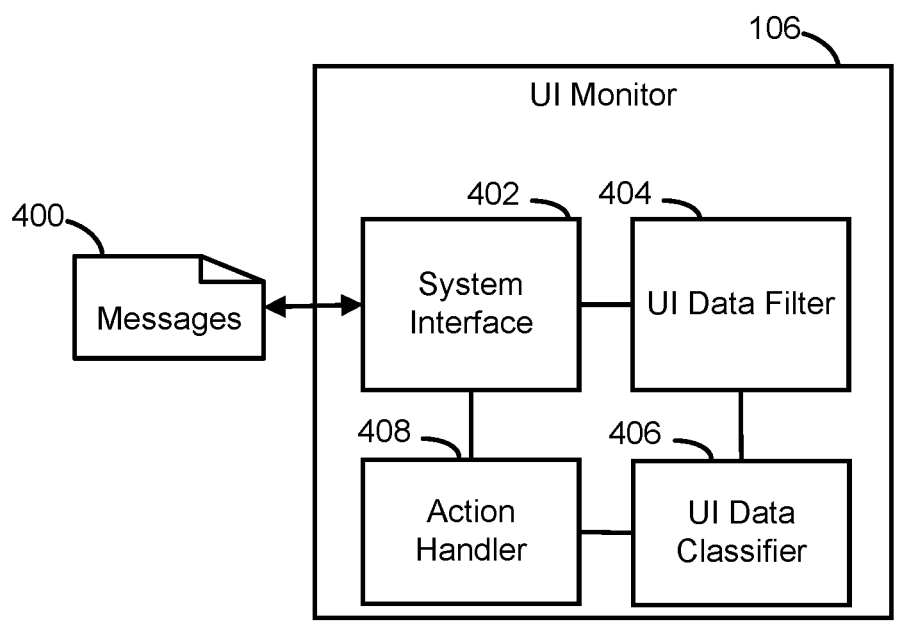
FIG. 4 is a block diagram of a user interface (UI) monitor in accordance with an example of the present disclosure.

As noted above, to provide for a multi-device notification system as described herein, a monitoring component such as the UI monitor 106 as shown in FIG. 1 and described above can be configured to monitor information presented to a user in a workspace application for a dialog including an alert or other similar notification. As shown in FIG. 4, the UI monitor 106 of client workstation 102*a* as shown in FIG. 1 can include a system interface 402, a UI data filter 404, a UI data classifier 406, and an action handler 408. In some examples, the system interface 402 can be configured to interoperate with various components by exchanging messages 400 with the components. These components can include, for example, a workspace application (e.g., workspace application 104a of FIG. 1) and/or a workspace backend (e.g., workspace backend 114 of FIG. 1). The messages 400 can include the UI data (e.g., data to be displayed in an embedded browser within the workspace application), signatures that identify error messages, and other data. The system interface 402 is configured to enable the monitor 106 to interoperate with these various components. As such, the system interface 402 may expose and implement an application programming interface (API) and/or transmit and receive messages that conform with the APIs or interfaces of other components.

For instance, in some examples, the system interface 402 can be configured to interoperate with a gateway process or a monitored application to request and receive hypertext markup language (HTML) encoded documents, which constitute a description of at least a portion of the UI of the monitored application. In other examples, the system interface 402 can be configured to receive, from one or more operating system services, hook messages and/or UI automation messages descriptive of the operation of a monitored application.

In some examples, the filter 404 can be configured to receive the UI data from the system interface 402 and determine whether the UI data includes changes from previously analyzed UI data. In these examples, the filter 404 can be further configured to provide, where the UI data includes one or more changes, differences between the UI data and the previously analyzed data to the classifier 406.

The particular configuration of the filter 404 varies with the type of the UI data available to be processed. For instance, in certain examples, the UI data represents a complete screen of the UI of the monitored application. In these examples, the filter 404 is configured to maintain (e.g., in memory) a previous version of UI data to compare against a current version of the UI data to identify differences, which may represent error messages.

In one example, the filter 404 is configured to compare the HTML data to previously received HTML data to determine whether the HTML data includes one or more changed HTML elements. To facilitate comparison of the HTML data and the previously received HTML data, the HTML data can be received and/or stored in a first document object model (DOM) and the previously received HTML data can be received and/or stored in a second DOM. To identify changed HTML elements, the filter 404 can be configured to scan each DOM from its root object downward and to generate a set of identified objects within the first DOM that have no corresponding object in the second DOM or that have a corresponding object with different attributes in the second DOM. This set of identified objects within the first DOM can represent the one or more changed UI elements.

In some examples, the filter 404 can be further configured to remove identified objects that will not be reflected in the UI from the set of identified objects. For instance, in some examples, the filter 404 can be configured to access the cascading styles sheets (CSS) attribute of identified objects and remove, from the set of identified objects, any identified objects for which the CSS attribute is set to "none." In other examples, the filter 404 can be further configured to call the window.getComputedStyle( ) function to determine whether any HTML elements within the DOM that are applied to an identified object would cause it to not be reflected in the UI. The filter 404 can remove any such objects from the set of identified objects. In still other examples, the filter 404 can be further configured to assess the zIndex property of identified objects and remove, from the set of identified objects, any members that would not be reflected in the UI due to obstructions caused by other objects. In certain examples, the filter 404 can be further configured to provide the filtered set of identified objects to the classifier 406 for subsequent processing.

In another example, the filter 404 can be configured to construct a current representation of the UI using the UI automation messages and/or the hook messages and to compare the current representation to a previously constructed representation. In some examples, the filter 404 can interoperate with the UI automation and/or hook operating system processes via the system interface 402 to construct the representations used for comparison purposes. More specifically, the filter 404 is configured to construct the representations by enumerating each automation or hook element of the UI and determining, via attributes of each element, whether the element is to be visibly rendered within the UI. Elements that are to be visibly rendered are included in a representation. Elements that are not to be visibly rendered are not included in the representation.

In this example, to identify changed automation or hook elements, the filter 404 can be configured to scan each representation from its root element downward and to generate a set of identified elements within the current representation that have no corresponding element in the previous representation or that have a corresponding element with different attributes in the previous representation. In some examples, the filter 404 can be configured to provide the changed elements to the classifier 406 for further processing.

In some examples, the filter 404 can be configured to receive, via the system interface 402, notifications that identify the changed DOM objects or automation/hook elements. In these examples, the processing executed by the filter 404 is minimal, as the changed objects or elements are identified within the notifications. To enable the filter 404 to receive notifications that identify the changed objects or elements, the filter 404 can be configured to transmit a subscription request to the automation or hook process that monitors the monitored application and/or to the monitored application itself. For instance, in some examples where the monitored application is a browser or includes an embedded browser, the filter 404 can be configured to interoperate with the browser via the MutationObserver Web API to subscribe to notifications regarding DOM events. The MutationObserver Web API can provide a set of events together, which allows the filter 404 to operate more efficiently. Each notification provided by the MutationObserver Web API includes details of changed objects. In some examples, the filter 404 can be configured to process the details, such as new objects added to the DOM and/or attribute changes to existing objects in the DOM. In a similar fashion, the filter 404 can be configured to subscribe to Windows UI events via the UI Automation Framework API for various types of controls. In these examples, the filter 404 can be configured to provide the changed objects or elements to the classifier 406 for further processing. The filter 404 can also be configured to take no additional action where no changed objects or elements are identified.

In some examples, the classifier 406 can be configured to determine whether changed DOM objects or automation/hook elements represent a dialog to be displayed to the user of, for example, a workspace application. In these examples, the classifier 406 can be configured to receive the changed objects or elements and to execute one or more classification processes depending on the type of data stored in the objects or elements. For example, to handle a case where the type of data stored in the objects or elements is text data, the classifier 406 can be configured to execute a keyword search process to identify whether the text data includes any keywords or other similar contextual information from, for example, a user-configurable dictionary associated with the UI monitor 106. The keywords searched for by the classifier can include keywords such as "error," "warning," or other keywords that are customarily displayed within error dialogs. In some examples, the keyword search process is configured to search for literal keywords and text that matches one or more regular expressions stored in metadata associated with commonly displayed dialogs. To handle a situation in which the type of data is image data, the classifier 406 can be configured to execute an optical character recognition (OCR) process (e.g., transmit a request to an OCR cloud API or execute locally) to extract text from the image data and to execute the keyword search on the extracted text.

Additionally or alternatively, to handle a situation in which the type of data is image data, the classifier 406 can be configured to execute a machine learning process trained to identify features within the image data that are commonly displayed in error messages. For example, the classifier 406 can execute a convolutional neural network trained to detect error messages within image data. In this example, the convolutional neural network can be trained to detect error text and/or other visual objects, such as stop sign icons, warning sign icons, and the like within the image data. It should be noted that the classification techniques described above can be combined in various examples of the classifier 406 in accordance with the principles described herein. The classifier 406 can be further configured to provide changed objects or elements that represent a dialog to be displayed to the user of the workspace application to action handler 408 for further processing. The classifier 406 can also be configured to take no further action where the changed objects or elements do not represent a dialog to be displayed.

In some examples, the action handler 408 can be configured to perform various functions in response to information received from the classifier 406. For example, if the classifier 406 identifies a change in the UI data that is indicative of a dialog to be presented to the user of a workspace application, the action handler 408 can extract various information from the dialog such as any text to be display as well as any user-selectable controls that may be included with the dialog such as selection controls and/or confirmation controls as shown in, for example, FIG. 2 and described above. In such an example, the action handler 408 can extract various information from the dialog such as text, controls, associated application information (e.g., what specific application instance within the workspace application issued the dialog), page information, device information, and other similar information. The action handler 408 can provide the extracted information, along with one or more instructions, to the system interface 402 to provide a copy of the extracted dialog details to the workspace backend.

It should be noted that the components and process for identifying changes to UI data and identifying the changes as dialog for presentation to a user is described herein by way of example only. It should also be noted that the UI monitor is described and shown as a component of the first client computing device by way of example only. In some implementations, the UI monitor, or one or more components of the UI monitor, can be implemented at a remote location such as the workspace host device. For example, when the user is interacting with a distributed application such as a web-based application and/or an SaaS application, the workspace host device can implement one or more functions of the UI monitor to detect changes in UI data and identify the changes as dialog for presentation to a user in one or more distributed applications as described herein.

Figure 5:
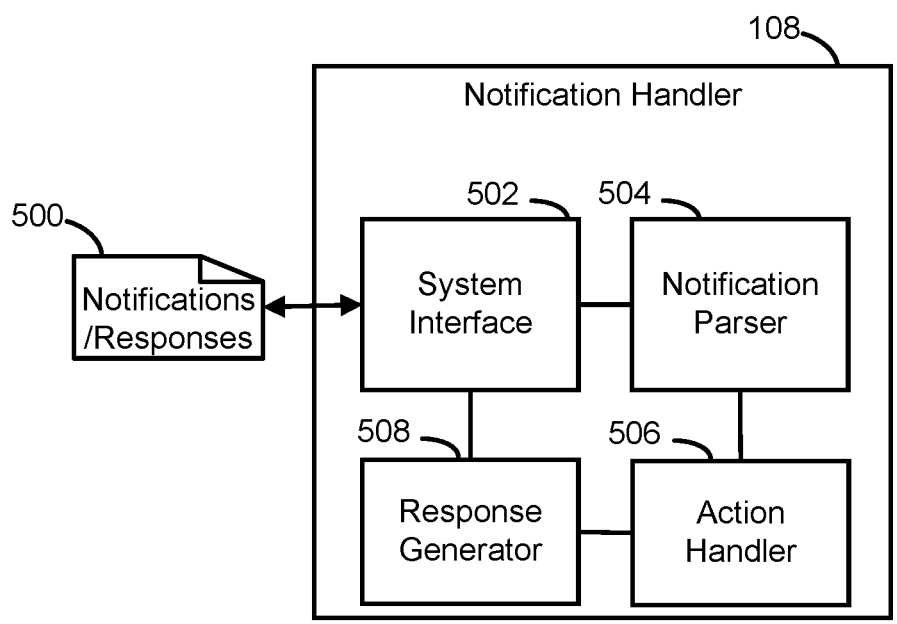
FIG. 5 is a block diagram of a notification handler in accordance with an example of the present disclosure.

As further noted above, to provide for a multi-device notification system as described herein, a component configured to monitor for notifications such as the notification handler 108 as shown in FIG. 1 and described above can be configured to monitor user notification on a secondary user device. As shown in FIG. 5, the notification handler 108 of secondary client device 102*b* as shown in FIG. 1 can include a system interface 502, a notification parser 504, an action handler 506, and a response generator 508. In some examples, the system interface 502 can be configured to interoperate with various components by receiving notifications 500 from the components and providing one or more response to the notifications 500 back to the components. These components can include, for example, a workspace application (e.g., workspace application 104*b* of FIG. 1) and/or a workspace backend (e.g., workspace backend 114 of FIG. 1). The notifications 500 can include notification information received from the workspace backend and originating from, for example, a primary client workstation such as workstation 102*a* as shown in FIG. 1. The system interface 502 can be configured to enable the notification handler 108 to interoperate with these various components. As such, the system interface 502 may expose and implement an API and/or transmit and receive messages that conform with the APIs or interfaces of other components.

For instance, in some examples, the system interface 502 can be configured to interoperate with a gateway process or a monitored application to request and receive notification information, which constitute a description of at least a portion of a notification to be presented to a user of a workspace application as described herein.

As shown in FIG. 5, the system interface can be configured to provide information to the notification parser 504. In some examples, the notification parser 504 can be configured to parse and analyze the notification information received by the system interface 502 in the notifications 500. For example, the notification parser 504 can analyze the notification information and extract various data such as notification text, contextual information related to the notification, user response control information, information related to the application issuing the notification, and other similar information.

In some examples, the notification parser 504 can pass the extracted notification information to the action handler 506. The action handler 506 can be configured to process the extracted notification information, generate one or more alerts and/or notifications to be displayed to the user on the secondary client device, and monitor for a user response to the displayed alert and/or notification. For example, if the extracted notification information includes an idle session counter, the action handler 506 can generate a notification to display on the secondary client device similar to the notification as shown in FIG. 3B and described above that includes a dynamic timer that is updated regularly (e.g., every second) to indicate the time remaining for the user to provide a response. Upon displaying the notification, the action handler 506 can monitor for a user response to the notification.

In some examples, if the action handler 506 does not determine that the user has responded to the displayed notification, the action handler 506 does not provide any additional information to the response generator 508. Conversely, if the action handler 506 does receive a user response to the displayed notification, the action handler 506 can extract any specific response information from the response (e.g., did the user respond affirmatively or negatively) and provide the extracted response information to the response generator 508.

In some examples, the response generator 508 can receive the extracted response information from the action handler 506 and process the information to format a response for transmission by the system interface 502. For example, the response generator 508 can properly format the user's response into a format expected by the workspace backend and provide the formatted response to the system interface 502 for transmission to the workspace backend as described herein.

Figure 6:
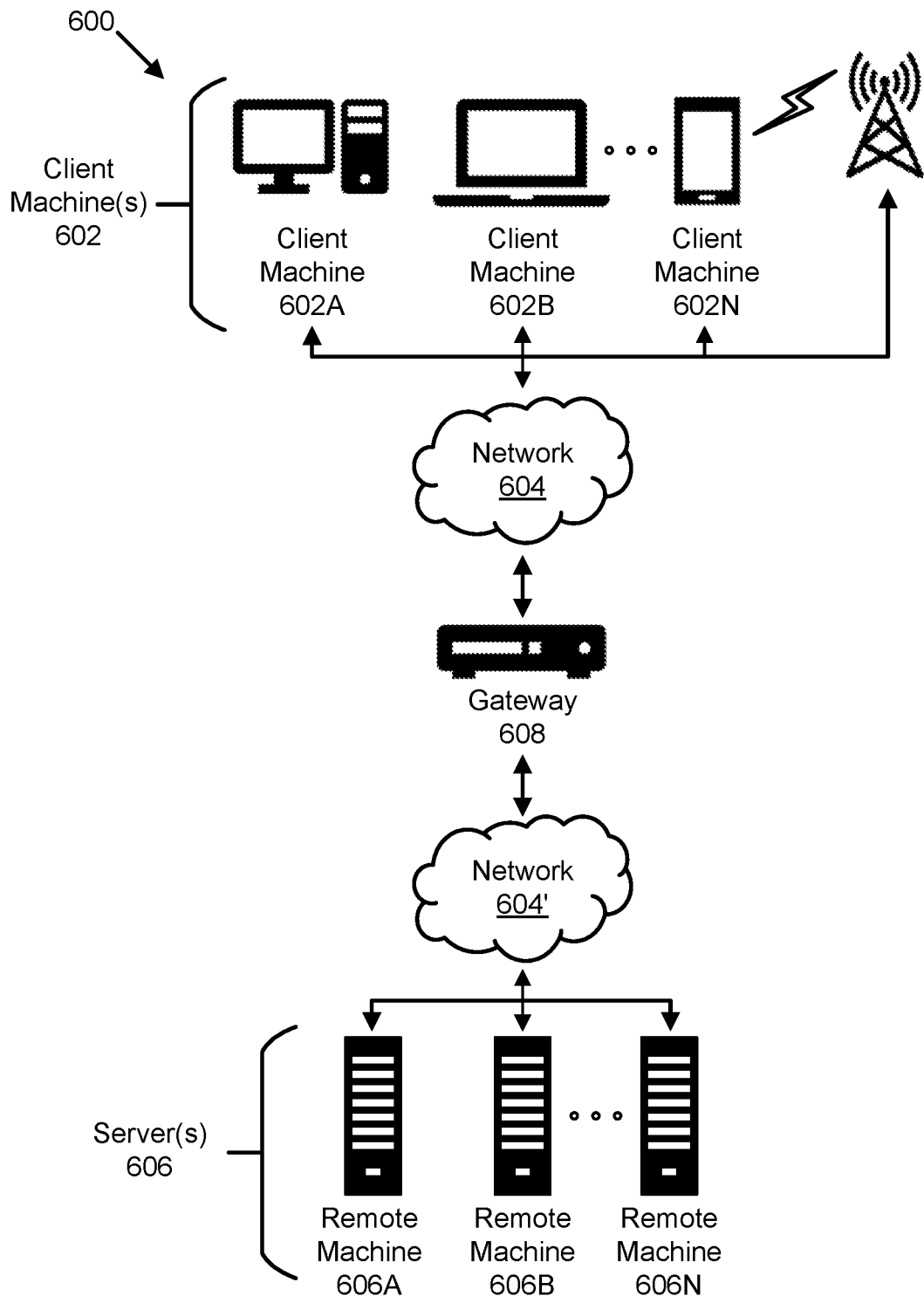
FIG. 6 is a block diagram of a sample network environment of computing device in which various aspects of the present disclosure can be implemented.

As noted above in FIG. 1, various computing devices can be arranged into one or more interconnected networks to provide user access to remote resources through various client devices. Referring to FIG. 6, a non-limiting network environment 600 provides an alternative arrangement to network 100 as shown in FIG. 1, in which various aspects of the disclosure can be implemented includes one or more client machines 602A-602N, one or more remote machines 606A-606N, one or more networks 604, 604', and one or more appliances 608 installed within the computing environment 600. The client machines 602A-602N communicate with the remote machines 606A-606N via the networks 604, 604'. The computing environment 600 can also be referred to as a distributed computer system.

In some examples, the client machines 602A-602N communicate with the remote machines 606A-606N via an intermediary appliance 608. The illustrated appliance 608 is positioned between the networks 604, 604' and may also be referred to as a network interface or gateway. In some examples, the appliance 608 can operate as remote computing device configured to provide clients with access to business applications and other data deployed in a datacenter, the cloud, or delivered as SaaS applications across a range of client devices, and/or provide other functionality such as load balancing, etc. In some examples, multiple appliances 608 can be used, and the appliance(s) 608 can be deployed as part of the network 604 and/or 604'.

The client machines 602A-602N may be generally referred to as client machines 602, local machines 602, clients 602, client nodes 602, client computers 602, client devices 602, computing devices 602, endpoints 602, or endpoint nodes 602. In certain implementations, client machines 602 can include, for example, client workstation 102*a* and secondary client device 102*b* as shown in FIG. 1 and described above.

The remote machines 606A-606N may be generally referred to as servers 606 or a server farm 606. In some examples, a client device 602 can have the capacity to function as both a client node seeking access to resources provided by a server 606 and as a server 606 providing access to hosted resources for other client devices 602A-602N. The networks 604, 604' may be generally referred to as a network 604. The networks 604 can be configured in any combination of wired and wireless networks.

A server 606 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. In some examples, a server 606 can include the functionality of the workspace host device 112 as shown in FIG. 1 and described above.

A server 606 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 606 can execute a remote presentation services program or other program that uses a thin client or a remote-display protocol to capture display output generated by an application executing on a server 606 and transmit the application display output to a client device 602.

In yet other examples, a server 606 can execute a virtual machine providing, to a user of a client device 602, access to a computing environment. The client device 602 can be a virtual machine. The virtual machine can be managed by, for example, a hypervisor, a virtual machine manager (VMM), or any other hardware virtualization technique within the server 606.

In some examples, the network 604 can be: a LAN; a MAN; a WAN; a primary public network; and a primary private network. Additional examples can include a network 604 of mobile telephone networks that use various protocols to communicate among mobile devices. For short range communications within a WLAN, the protocols can include 802.11, Bluetooth, and NFC. In certain examples, the network 604 can include network 110 as shown in FIG. 1 and described above.

Figure 7:
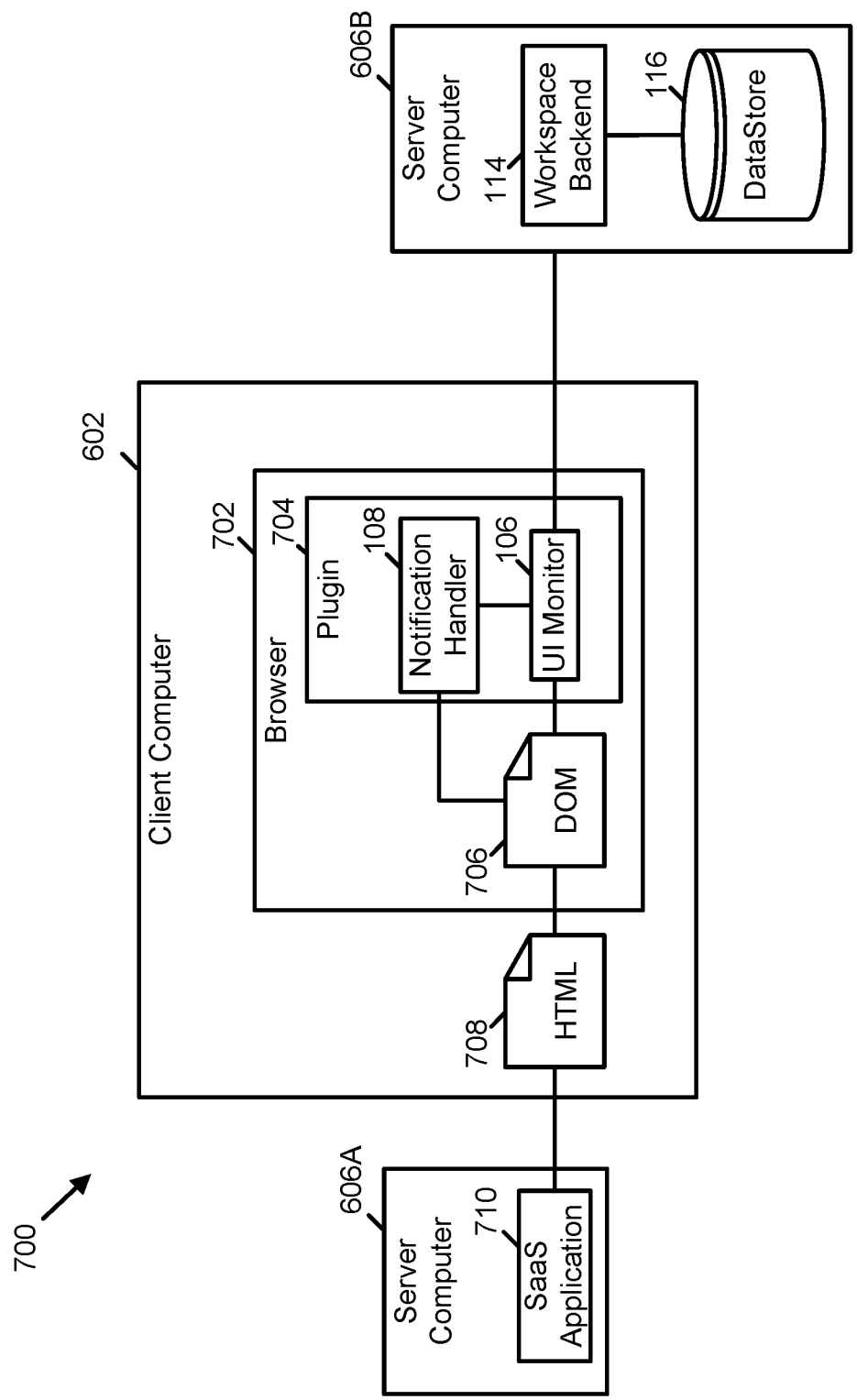
FIG. 7 is a block diagram of a dialog monitoring and notification system in accordance with an example of the present disclosure.

FIG. 7 illustrates a system for providing notification information to multiple client devices (e.g., the system 100 of FIG. 1) configured for operation within a distributed computing platform (e.g. the network environment 600 of FIG. 6). As shown in FIG. 7, the configuration 700 can include the client computer 602 and the server computers 606A and 606B of FIG. 6. As shown in FIG. 7, the server 606B can be configured to function as, for example, the workspace host device 112 of FIG. 1. Within the configuration 700, the computer systems 602, 606A, and 606B can be communicatively coupled to one another and exchange data via a network (e.g., the networks 604 and/or 604' of FIG. 6).

As shown in FIG. 7, the server 606A can be configured to host an SaaS and/or Web application 710. The client 602 is configured to host an embedded browser 702 associated with, for example, a workspace application as described herein. The server 606B can be configured to host the workspace backend 114 and the datastore 116. The browser 702 can include a plug-in 704 that includes the UI monitor 106 and the notification handler 108 of FIG. 1. Many of the components illustrated in FIG. 7 are described above with reference to FIGS. 1 and 6. For purposes of brevity, those descriptions will not be repeated here, but each of the components of FIGS. 1 and 6 included in FIG. 7 is configured to function in FIG. 7 as described in FIGS. 1 and 6. However, the descriptions of any of these components may be augmented or refined below.

As illustrated in FIG. 7, the server 606A is configured to serve the SaaS and/or Web application 710 to the browser

702. As part of this service, the server 606A is configured to transmit one or more HTML encoded documents 708 to the client 602 using, for example, HyperText Transfer Protocol (HTTP), and the browser 702 is configured to load the HTML documents 708 into a DOM 706.

In some examples of the configuration 700, the browser 702 is configured to support DOM event notifications. In these examples, the UI monitor 106 can be configured to subscribe to these notifications and to receive and process the notifications to detect changed DOM objects. In other examples of the configuration 700, the browser 702 does not support DOM event notifications. In these examples, the UI monitor 106 can be configured to poll the browser 702 for a copy of the DOM 706 and process a sequence of copies of the DOM to detect changed objects. For instance, in at least one example, to receive a consistent stream of copies to analyze, the UI monitor 106 is configured to transmit (e.g., via the system interface 402 of FIG. 4) polling requests to the browser 702 on a periodic basis, such as between every two HTTP requests/responses. Regardless of the technique used to detect changed objects, the components of the system as illustrated in FIG. 7 are configured to interoperate to detect dialog notifications represented in the changed objects and provide additional notifications to secondary client devices as described herein.

The configuration 700 is but one example of many potential configurations that can be used to implement the system 100. For instance, in some examples, the UI monitor 106 can be configured to provide signatures to the browser 702 rather than the notification handler 108. In these examples, the browser 702 can be configured to interoperate with the notification handler 108 to drive dialog detection and additional notification generation as described herein. In other examples, the UI monitor 106 can be configured to communicate dialog information to other processes hosted by the client 602. In other examples, the notification handler 108 can be configured to interoperate with the browser 702 or other process hosted by the client 602 to provide additional notification generation as described herein. As such, the examples disclosed herein are not limited to the particular configuration 700 and other configurations are considered to fall within the scope of this disclosure.

Sample Implementation Processes

Figure 8:
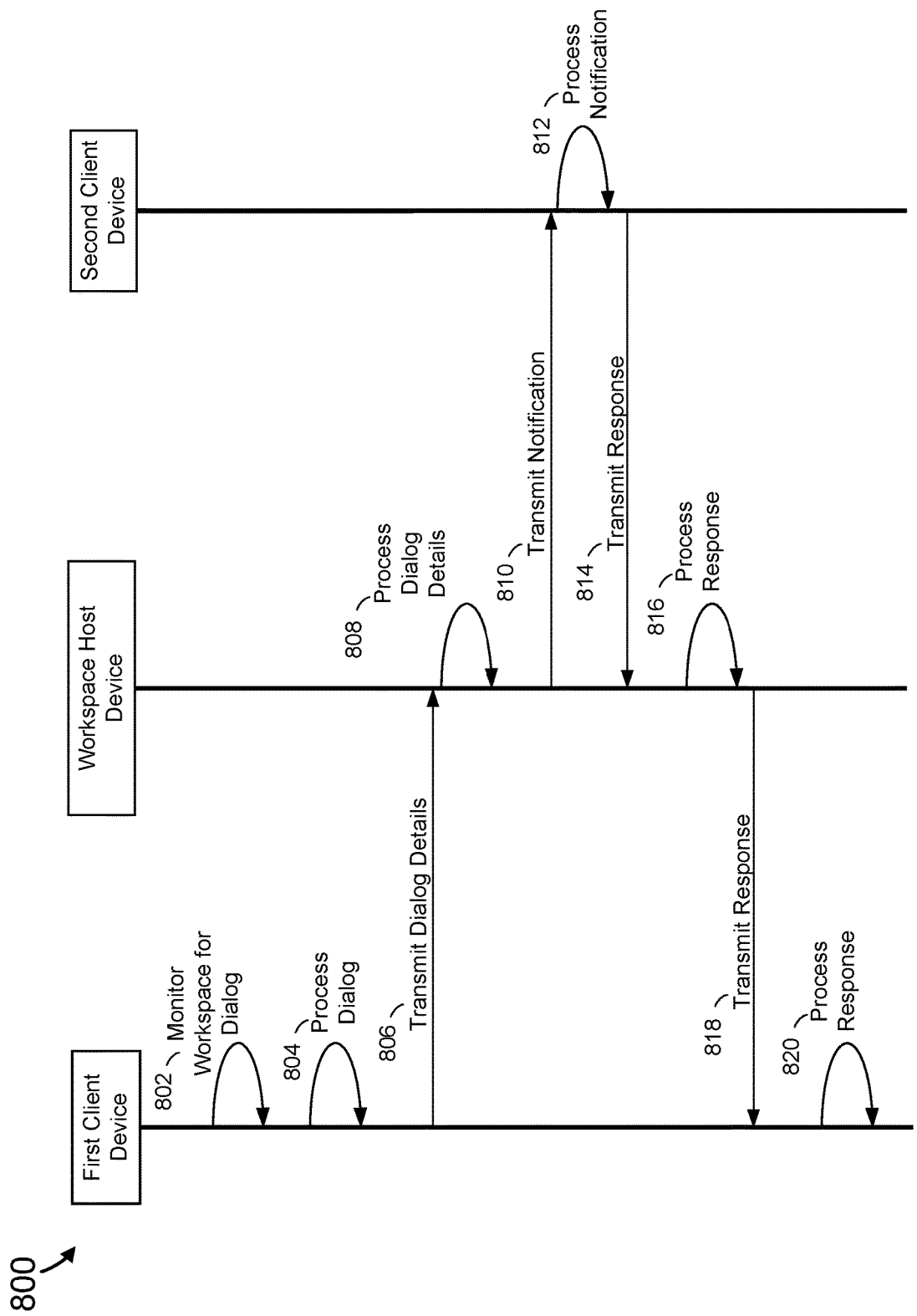
FIG. 8 is a sequence diagram illustrating a sample diagram of dialog monitoring and notification in accordance with an example of the present disclosure.

FIG. 8 illustrates a sample sequence diagram 800 of a process for monitoring for a dialog at a first computing device and providing a notification of the dialog at a second computing device as described herein. Diagram 800 as shown in FIG. 8 and described below is intended to provide an overview of the monitoring and notification techniques as described herein. As shown in the diagram 800, a first client device such as client workstation 102a as shown in FIG. 1 and described above can access a distributed workspace. A monitoring component such as a UI monitor as described herein (e.g., UI monitor 106 as shown in FIG. 1 and described above) can monitor 802 the distributed workspace for a dialog window or other similar message presented to the user of the first client device. Upon detecting a dialog, the UI monitor can process 804 the dialog as described herein. For example, the UI monitor can determine which application in the distributed workspace has issued the dialog, whether there is text or any images associated with the dialog, what type of response is requested of the user, whether there is a time limit for responding to the dialog, and other similar dialog details.

The UI monitor can further transmit 806 the dialog details to a workspace host device such as workspace host device 112 as shown in FIG. 1 and described above. The workspace host device can include a workspace backend component (e.g., workspace backend 114 as shown in FIG. 1 and described above) that is configured to receive and process 808 the dialog details. For example, the workspace backend can process the dialog details to determine which first client device has transmitted the dialog details, if there are any additional registered client devices associated (e.g., by having authenticated the user via user login) with the user of the first client device, and content information related to the dialog. If the workspace backend does determine another client device associated with the user of the first client device, the workspace backend can transmit 810 a notification to the second client device, the notification including the dialog details as received from the first client device. The second client device can include another client device associated with the user of the first client device such as secondary client device 102b as shown in FIG. 1 and described above. A notification handler associated with the second client device (e.g., notification handler 108 as shown in FIG. 1 and described above) can receive and process 812 the notification. For example, the notification handler can process the notification information, format the information for display on the second client device, display the information, and monitor for a user response to the displayed notification information. Upon receipt of a user response, the notification handler can format the response information and transmit 814 the response information to the workspace host device. The workspace backend can receive and process 816 the response information to, for example, determine what device the response information is from, determine what user-provided information is contained in the response information, and what additional user device the response information is to be directed to. In this example, the workspace backend can process 816 the response to determine that the response information is to be sent back to the first client device. The workspace backend can transmit 818 the response information to the first client device, and the UI monitor or another similar processing component of the first client device can process 820 the response accordingly.

For example, the processing component of the first client device can be configured to analyze the response information to determine an action taken and a corresponding item or other similar object associated with the action. For example, the processing component can determine that the response information includes an action "click" on an object button labeled "accept." In such an example, the processing component can translate or otherwise apply the determined information from the response information to corresponding objects in the original dialog. In such an example, the processing component can identify a button labeled "accept" in the original dialog and implement, for example, a click method or other similar action call such that a click is applied to the object labeled "accept." Additional detail related to the processing of the response is described below in the discussion of FIG. 9A.

Additional detail of the process steps performed by the individual computing devices referenced in FIG. 8 is provided in the following discussions of FIGS. 9A and 9B, FIG. 10, and FIG. 11. For example, additional detail related to operation of the first client device is provided in the discussion of FIGS. 9A and 9B below. Similarly, additional detail related to the operation of the workspace host device is provided in the discussion of FIG. 10 below and additional detail related to the operation of the second client device is provided in the discussion of FIG. 11 below.

It should be noted that sequence diagram 800 as shown in FIG. 8 and described above, as well as the following discussions of FIGS. 9A-11, are directed to a system including two specific client computing device's by way of example only. As noted above, in some examples, the notification of the dialog can be provided on the first client device such that the user is made aware of the dialog. For example, if the user is interacting with a tab-based browser and a dialog is display in a non-active or otherwise unselected tab, the notification can include an indication of what tab the dialog is provided in. In some examples, the tab including the dialog can be propagated to the active tab in the browser for display to the user. A similar technique can be used in a window-based browser or workspace. If a dialog is detected in a non-active or unselected window, the notification can include an indication of what window the dialog is provided in and, in some examples, the window with the dialog can be propagated to the front of the workspace as the active window for display to the user. As such, the sequence steps as shown in FIG. 8 and described above, and the process steps as shown in FIGS. 9A-11 and described below, can be modified to provide dialog notifications in a system including a single client computing device.

Figure 9A:
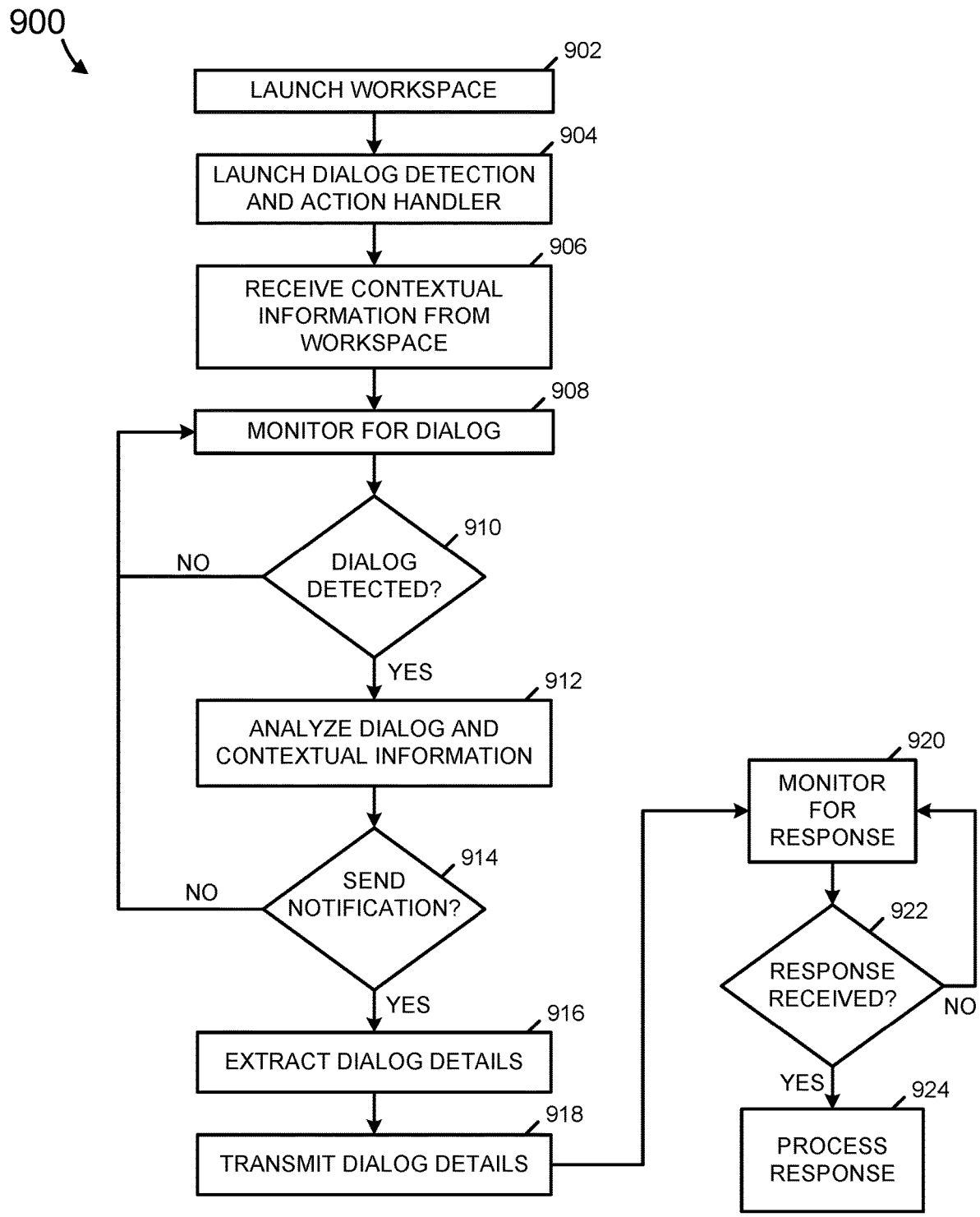
FIGS. 9A and 9B are flow diagrams of a dialog monitoring process as implemented by a first client computing device in accordance with an example of the present disclosure.

FIG. 9A illustrates a sample process 900 for monitoring for and responding to a displayed dialog, the process implemented, for example, by a processor configured to execute a workspace application on a client device such as client workstation 102a as shown in FIG. 1. For example, as shown in FIG. 9A, the processor can be configured to launch 902 the workspace application, thereby providing the user of the client device with access to at least a portion of a distributed workspace. The processor can further launch 904 a UI monitor as described above, including dialog detection and action handling functionality.

As further shown in FIG. 9A, the processor can further receive 906 contextual information about information being displayed on the client device from the workspace application. For example, the contextual information can include information being displayed by one or more applications running within the workspace application as well as any dialog information that may be displayed within the workspace application. For example, the processor can further monitor 908 the workspace application for one or more dialogs as described herein. For example, monitoring 908 for one or more dialogs can include recording and analyzing changes in displayed information within the workspace application. During monitoring, the processor can determine 910 whether a dialog has been detected.

Figure 9B:
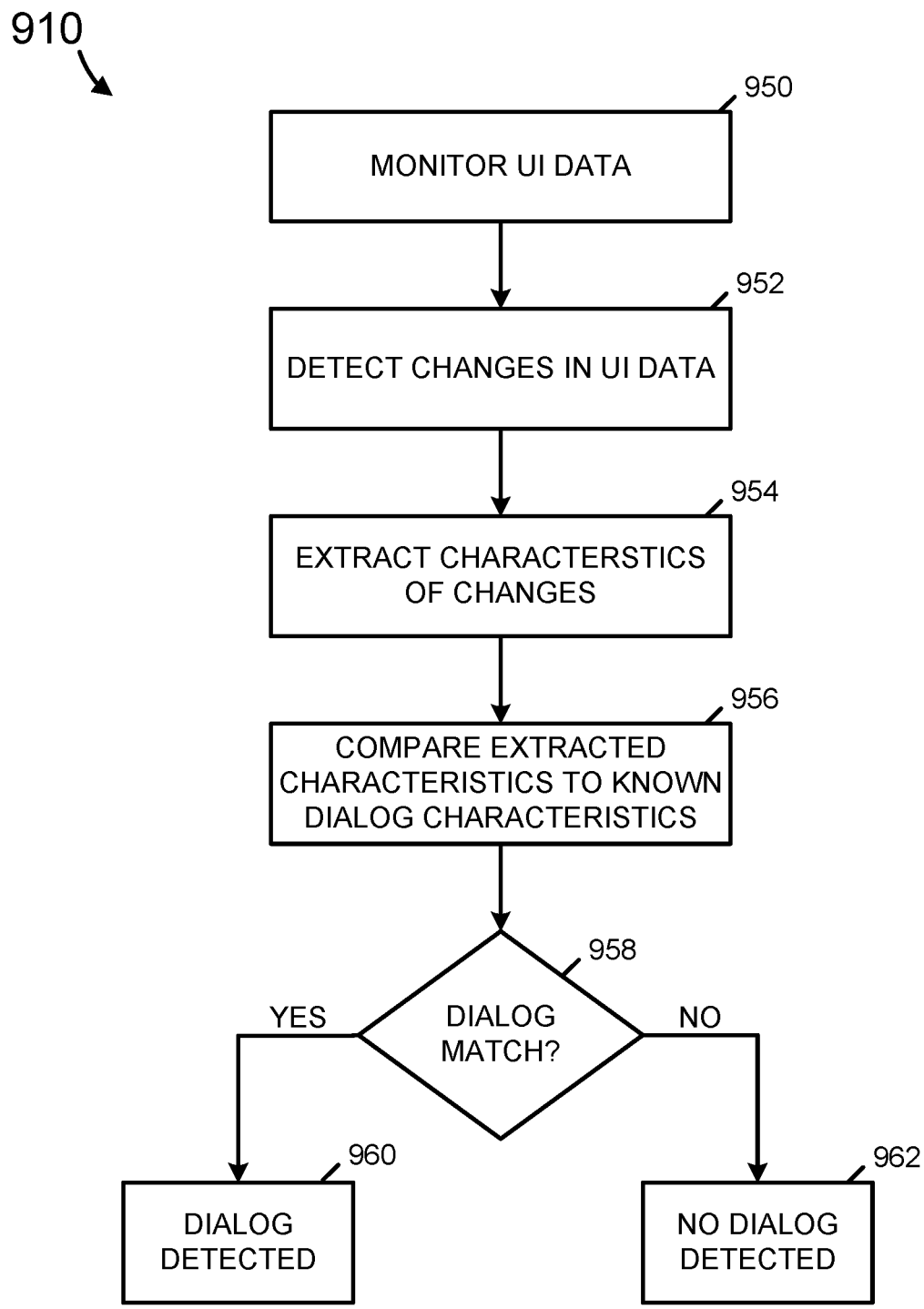

For example, FIG. 9B provides a more detailed process for determining 910 whether a dialog has been detected. As shown in FIG. 9B, the processor can monitor 950 UI data using, for example, UI monitor 106 as described above. For example, the UI monitor can subscribe to receive notifications regarding UI data from the monitored application and/or from other system processes (e.g., hook processes and/or UI automation processes) that monitor the monitored application. Alternatively or additionally, the UI monitor can periodically poll the monitored application and/or other system processes to acquire UI data.

The processor can detect 952 a change in one or more elements of the UI. For instance, the UI monitor can execute a filter (e.g., the UI data filter 404 of FIG. 4) that processes the UI data to detect changes therein. In some examples, the notifications received during monitoring 950 are descriptive of the changes and the filter need only parse them to detect the changes. In other examples, the filter maintains a sequence of representations of the UI and compares members of the sequence to detect changes.

As further shown in FIG. 9B, the processor can extract 954 particular characteristics of the detected changes. For example, the processor can extract 954 information such as what application are the changes associated with, are the changes to previously existing text or images or are the changes an introduction of a new window including text and/or images, do the changes include a dynamic element such as a timer or other similar counter, do the changes include one or more user-selectable options for receiving a user response, and other similar characteristics associated with the detected changes. The processor can then compare 956 the extracted dialog characteristics to predefined dialog characteristics that indicate the presence of a dialog within the changes to the UI. Based upon this comparison, the processor can determine 958 if the extracted characteristics indicate that there is dialog match, i.e., that the detected changes are indicative of a new dialog in the workspace application.

As shown in FIG. 9B, if the processor does determine 958 that the characteristics are indicative of a dialog match, the processor can return 960 that a dialog is detected. Conversely, if the processor determines 958 that the characteristics are not indicative of a dialog match, the processor can return 962 that no dialog has been detected.

Returning again to FIG. 9A, if the processor does not determine that a dialog has been detected, the processor can continue to monitor 908 the workspace application for a dialog. If, however, the processor does determine 910 that a dialog has been detected, the processor can analyze 912 the dialog and its associated contextual information. For example, the processor can perform an OCR process on the dialog to determine what text is included in the dialog, determine what application running within the workspace application issued the dialog, whether the dialog is related to an ongoing process or has otherwise halted a process, whether the dialog has a timer associated with receiving a response from a user, and other similar contextual information. Based upon the contextual information, the processor can determine 914 whether to send a notification of the dialog to a workspace host device running a workspace backend as described herein. For example, if the dialog requires a response from the user, the processor can determine 914 that a notification is to be sent to another client device. Conversely, if the dialog is a status bar or other similar dialog and/or notification that does not require a user response, the processor can determine that a notification does not need to be sent to another client device.

As shown in FIG. 9A, if the processor does determine 914 that a notification is to be sent, the processor can extract 916 dialog details from the dialog. For example, the dialog details can include any text included in the dialog, any images included in the dialog, any response options included in the dialog, which application running in the workspace application has issued the dialog, and other similar dialog details. The processor can transmit 918 the dialog details to the workspace backend.

As further shown in FIG. 9A, the processor can monitor 920 communications with the workspace backend for a response to the transmitted dialog details. If the processor determines 922 that a response has not been received from the workspace backend, the processor can continue to monitor 920 for a response. Conversely, if the processor does determine 922 that a response has been received, the processor can process 924 the response. For example, the processor can process 924 the response to determine a user-provided response, what specific dialog the response is provided as a reply to, what application the response is being directed to, and other similar information contained within the user-provided response.

Depending upon the application running and the specific information included in the response from the workspace backend, the processor can process 924 the response in a variety of manners. For example, if the response from the workspace backend includes specific response information such as an indication of a user action such as a click or other similar action, the processor can be configured to replicate the user's action accordingly. For example, the action may have an associated object that the action was applied such as a button or other similar input or selection object that the user acted upon when responding to a notification of a dialog. In such an example, the response information can further include the name or label of the object as well as the action taken. For example, the response information can include an indication that the user provided a click on an object labeled "accept." In such an example, when processing 924 the response, the processor can extract the object label and the action taken. The processor can identify an object in the original dialog that corresponds to the object included in the response information and replicate the action indicated in the response information on the object in the original dialog. To continue the above example, the processor can call a method for applying a click to the object "accept" in the original dialog.

In some examples, the response from the workspace backend can include additional and/or alternative information such a location or pixel specific information related to a response received from the user. For example, the notification of the dialog presented to the user can include an image of the original dialog including a graphical representation of the dialog as originally displayed on the first client computing device. In such an example, a position on the image that the user interacts with, such as an X,Y value associated with the pixel or a group of pixels in the image that the user selects, can be recorded and included in the response information from the workspace backend. In such an example, the processor can process 924 the response to determine what location in the notification the user interacted with, determine what portion of the original dialog that location corresponds to, and replicate the action of the user's response to the notification in the original dialog box. For example, the notification of the dialog as presented to the user can include an image of the original dialog, including a representation of an "accept" button and a "cancel" button. When the user selects one of the buttons (e.g., "accept"), the location of the user's selection can be recorded and included in the response information associated with the response as received from the workspace backend. In such an example, rather than include a labeled object and action as described above, the location information can be included in the response information. The processor can process 924 the response to determine the location information and translate the response information into a corresponding action in the original dialog as described herein.

Figure 10:
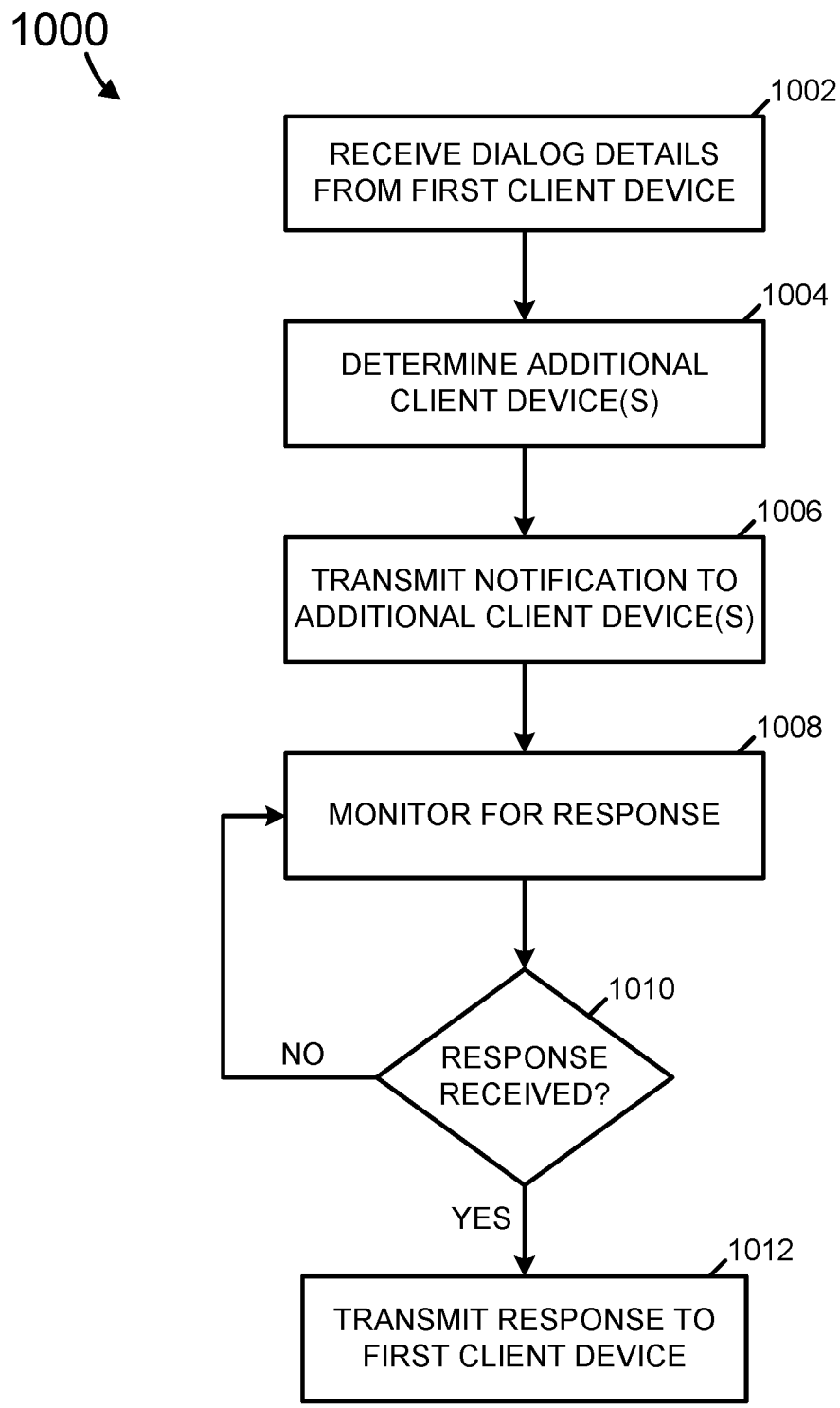
FIG. 10 is a flow diagram of a dialog monitoring process as implemented by a workspace host device in accordance with an example of the present disclosure.

As noted above, FIGS. 9A and 9B are directed to a process performed by a first client device during the dialog monitoring and notification system as described herein. FIG. 10 illustrates a process 1000 that can be implemented by a processor associated with, for example, a workspace host device such as workspace host device 112 as shown in FIG. 1 and described above.

As shown in FIG. 10, the processor of the workspace host device can receive 1002 the dialog details from the first client device. For example, as shown in FIG. 9A, the processor of the first client device can transmit 918 the extracted dialog details to the workspace backend running on the workspace host device. Referring back to FIG. 10, the processor of the workspace host device can receive 1002 the dialog details and process the details. For example, the processor can extract user-specific information related to the dialog details such as username, associated devices, associated authorization levels, and other similar user information. Based upon these details, the processor can determine 1004 one or more additional user devices associated with the user of the first client device that the processor can send the dialog details to for further processing. Based upon the programming of the workspace backend, the processor can further format the dialog details to construct a notification for one or more additional client devices. The processor can transmit 1006 the notification to the one or more additional client devices.

As further shown in FIG. 10, the processor can monitor 1008 for a response to the transmitted notification. If the processor determines 1010 that a response has not been received, the processor can continue to monitor 1008 for a response. If the processor determines 1010 that a response has been received, the processor can transmit 1012 the received response to the first client device, i.e., the device that provided the received dialog details. As noted above, the transmitted response can include response information related to specific details obtained or otherwise extracted from the response received in reply to the transmitted notification send to the one or more additional client devices.

Figure 11:
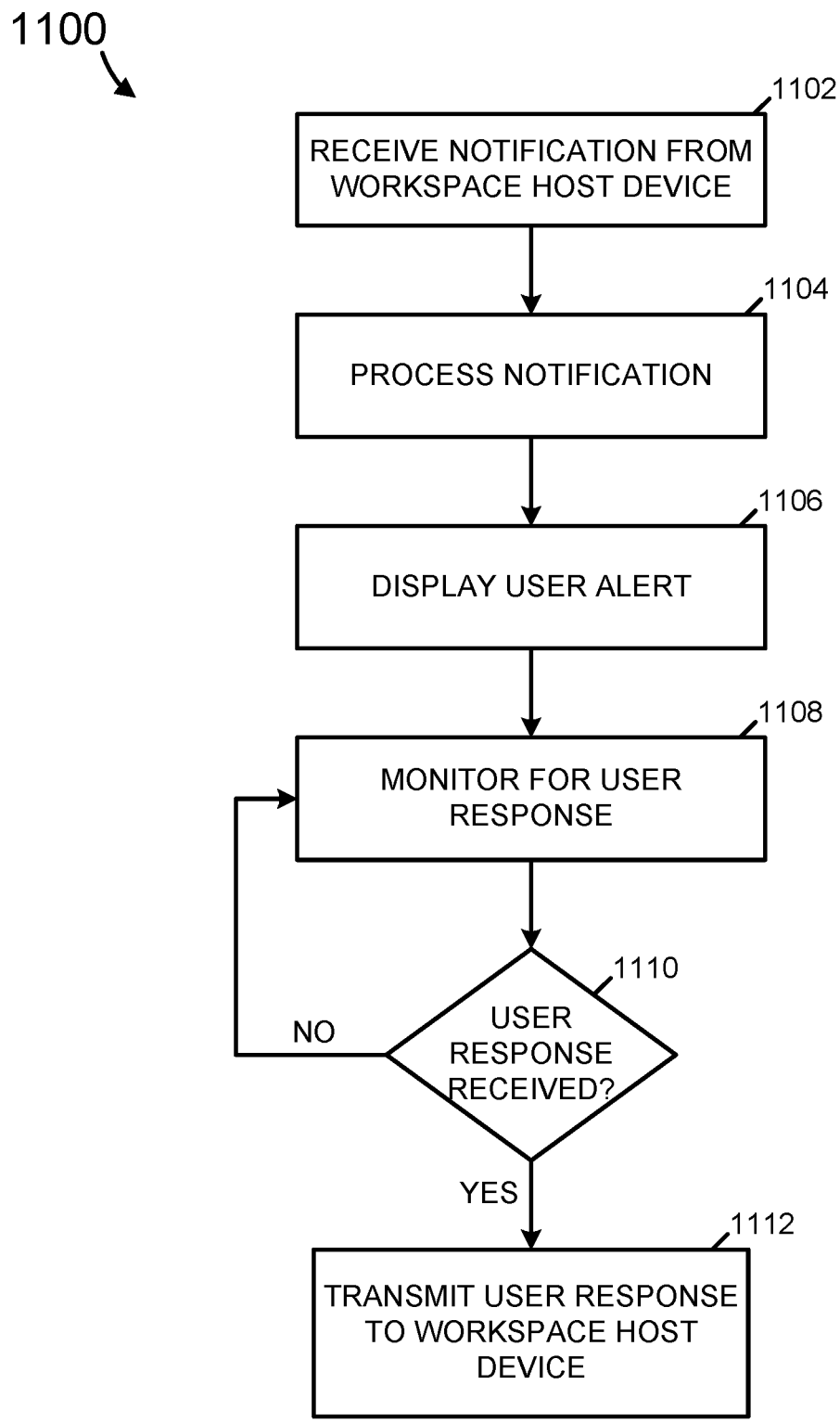
FIG. 11 is a flow diagram of a dialog monitoring process as implemented by a secondary client computing device in accordance with an example of the present disclosure.

FIG. 11 illustrates a process 1100 that can be implemented by a processor associated with, for example, a secondary client device such as secondary client device 102b as shown in FIG. 1 and described above. The secondary client device can be included in the one or more additional client devices as determined 1004 by the processor of the workspace host device as described in the above discussion of FIG. 10.

Referring to FIG. 11, the processor of the secondary client device can be configured to receive 1102 the notification information from the workspace host device. The processor can process 1104 the received notification to determine information to be displayed to the user of the second client device. For example, the processor can determine information related to the application issuing the original dialog, information related to the dialog itself including any text and/or image information contained in the dialog, user response options for responding to the dialog, whether there is a timer or other counter associated with the dialog, and other similar dialog information that may be contained within the received notification. Based upon the processed notification information, the processor can generate and display 1106 a user alert on a display of the secondary client device.

As further shown in FIG. 11, the processor can monitor 1108 for a user response. For example, the processor can monitor for a specific input such as a selection of a response option, a closing of the alert box without selecting a provided response, or another similar response. If the processor does not determine 1110 that the user has provided a response, the processor can continue to monitor 1008 for a user response. Conversely, if the processor does determine 1110 that the user has provided a response, the processor can transmit 1112 the user-provided response to the workspace host device for further processing, e.g., as shown in FIG. 10 and described above. As noted above, the response as transmitted to the workspace host device can include specific response information related to the response as received from the user such as action taken, and object acted upon information, location-specific information such as X,Y coordinates or pixel values of user interaction, and other similar response information as described herein.

It should be noted that the processes 900, 1000, and 1100 as shown in FIGS. 9A, 9B, 10, and 11 are provided individually for clarity purposes, and in actual implementation the individual computing devices would be working in concert to perform a combined process similar to the diagram 800 as shown in FIG. 8 and described above. It should also be noted that the specific process flow, and the order of sequence steps associated with the process flows as described herein, are provided by way of example only. Various steps contained within the process flows as described herein can be altered, reordered, or otherwise omitted depending upon the implementation of the techniques as described herein.

Hardware Implementation Examples

Figure 12:
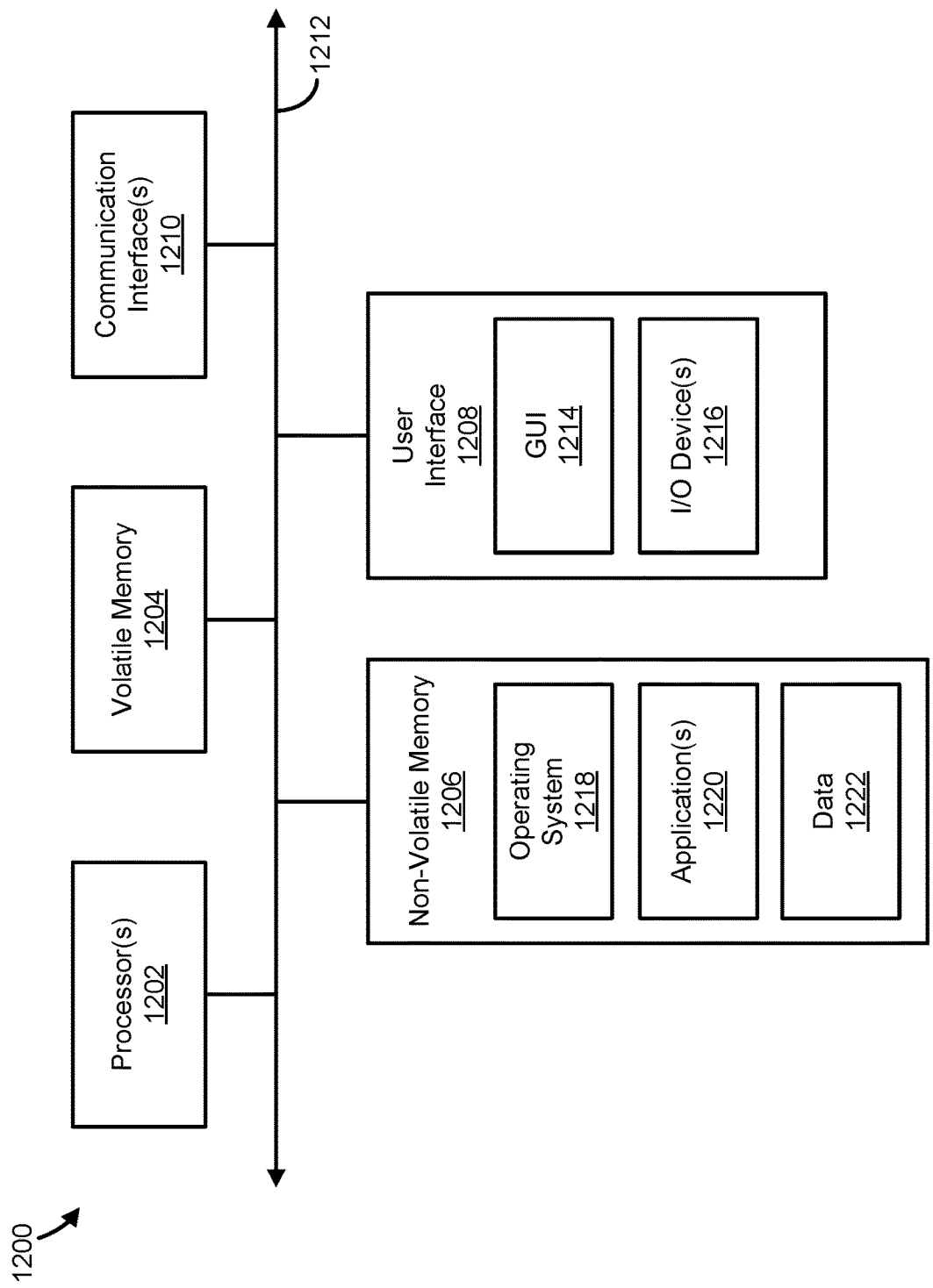
FIG. 12 is a block diagram of a computing device that can implement one or more of the computing devices of FIGS. 1, 6, and/or 7, in accordance with at least one example of the present disclosure.

FIG. 12 depicts a block diagram of a computing device 1200 useful for practicing an example of client devices 102*a* and 102*b* and/or workspace host device 112 as shown in FIG. 1 and described above. The computing device 1200 includes one or more processors 1202, volatile memory 1204 (e.g., random access memory (RAM)), non-volatile memory 1206, UI 1208, one or more communications interfaces 1210, and a communications bus 1212. One or more of the computing devices 1200 can also be referred to as a computer system.

The non-volatile memory 1206 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1208 can include a graphical user interface (GUI) 1214 (e.g., a touchscreen, a display, etc.) and one or more input/output (I/O) devices 1216 (e.g., a mouse, a keyboard, a microphone, one or more speakers, one or more cameras, one or more biometric scanners, one or more environmental sensors, and one or more accelerometers, etc.).

The non-volatile memory 1206 can store an operating system 1218, one or more applications 1220, and data 1222 such that, for example, computer instructions of the operating system 1218 and/or the applications 1220 are executed by processor(s) 1202 out of the volatile memory 1204. In some examples, the volatile memory 1204 can include one or more types of RAM and/or a cache memory that can offer a faster response time than a main memory. Data can be entered using an input device of the GUI 1214 or received from the I/O device(s) 1216. Various elements of the computing device 1200 can communicate via the communications bus 1212.

The illustrated computing device 1200 is shown merely as an example client device or server and can be implemented by any computing or processing environment with any type of machine or set of machines that can have suitable hardware and/or software capable of operating as described herein.

The processor(s) 1202 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 1202 can be analog, digital or mixed. In some examples, the processor 1202 can include multiple processor cores and/or multiple processors configured to provide functionality for parallel, simultaneous execution of instructions or for parallel, simultaneous execution of one instruction on more than one piece of data.

The communications interfaces 1210 can include one or more interfaces to enable the computing device 1200 to access a computer network such as a Local Area Network (LAN), a Wide Area Network (WAN), a Personal Area Network (PAN), or the Internet through a variety of wired and/or wireless connections, including cellular connections.

In described examples, the computing device 1200 can execute an application on behalf of a user of a client device (e.g., one or both of client devices 102*a* and 102*b* as shown in FIG. 1 and described above). For example, the computing device 1200 can execute one or more virtual machines managed by a hypervisor and accessed via, for example, a client agent. Each virtual machine can provide an execution session within which applications execute on behalf of a user or a client device, such as a hosted desktop session. The computing device 1200 can also execute a terminal services session to provide a distributed workspace environment. The computing device 1200 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A system for monitoring for and providing notification of application dialogs, the system comprising:
 a client computing device comprising
  a memory, and
  at least one processor coupled to the memory and configured to display user interface (UI) data from an application,
  detect, within the UI data, a dialog to display in the application,
  extract dialog details regarding the dialog from the UI data,
  transmit the dialog details to a server,
  receive a response to the dialog from the server, and
  respond to the dialog based on the response to the dialog from the server;
 wherein the dialog comprises information related to operation of at least one user-initiated process being completed by the server; and
 wherein the at least one user-initiated process comprises a process configured to manipulate at least one resource so as to render one or more operations relating to a distributed computing environment inaccessible to other users of the distributed computing environment until completion of the at least one user-initiated process.

2. The system of claim 1, wherein to detect the dialog comprises to identify changes in the UI data, the changes comprising changes in text to display in the application, changes in images to display in the application, a new window to display in the application, and/or one or more user-selectable response options to display in the application.

3. The system of claim 1, wherein the client computing device is a first client computing device, the memory is a first memory, the at least one processor is at least one first processor, and the system further comprises the server, the server comprising:
 a second memory; and
 at least one second processor coupled to the second memory and configured to receive the dialog details from the first client computing device,
  extract details related to a user of the first client computing device from the dialog details,
  determine at least one second client computing device associated with the user of the first client computing device, and
  transmit a notification including at least a portion of the dialog details to the at least one second client computing device.

4. The system of claim 3, wherein the at least one second processor is further configured to:
 receive a notification response from the second client computing device;
 generate the response to the dialog based upon the notification response; and
 transmit the response to the dialog to the first client computing device.

5. The system of claim 3, further comprising the at least one second client computing device, the at least one second client computing device comprising:
 a third memory; and
 at least one third processor coupled to the third memory and configured to receive the notification from the server,
  display at least a portion of the notification,
  receive a response to the at least a portion of the notification from a user of the first client computing device, and
  transmit a notification response to the server.

6. A method of monitoring for and providing notification of application dialogs, the method comprising:
 displaying, by a client computing device, user interface (UI) data from an application;
 detecting, within the UI data by the client computing device, a dialog to display in the application, detecting the dialog including detecting information related to operation of at least one user-initiated process being completed by the server;
 extracting, by the client computing device, dialog details regarding the dialog from the UI data;
 initiating the operation of the at least one user-initiated process, wherein the at least one user-initiated process comprises a process configured to manipulate at least one resource so as to render one or more operations relating to a distributed workspace inaccessible to other users of the distributed workspace until completion of the at least one user-initiated process;
 transmitting, by the client computing device, the dialog details to a server;
 receiving, by the client computing device, a response to the dialog from the server; and
 responding, by the client computing device, to the dialog based on the response to the dialog from the server.

7. The method of claim 6, wherein detecting the dialog comprises identifying changes in the UI data, the changes comprising changes in text to display in the application, changes in images to display in the application, a new window to display in the application, and/or one or more user-selectable response options to display in the application.

8. The method of claim 6, wherein detecting the dialog further comprises detecting information related to an idle session termination warning.

9. The method of claim 6, wherein the client computing device is a first client computing device and the method further comprises:
 receiving, by the server, the dialog details from the first client computing device;
 extracting, by the server, details related to a user of the first client computing device from the dialog details;
 determining, by the server, at least one second client computing device associated with the user of the first client computing device; and
 transmitting, by the server, a notification including at least a portion of the dialog details to the at least one second client computing device.

10. The method of claim 9, further comprising:
 receiving, by the server, a notification response from the second client computing device;
 generating, by the server, the response to the dialog details based upon the notification response; and
 transmitting, by the server, the response to the dialog details to the first client computing device.

11. The method of claim 9, further comprising:
receiving, by the second client computing device, the notification from the server;
displaying, by the second client computing device, at least a portion of the notification;
receiving, by the second client computing device, a response to the at least a portion of the notification from a user of the first client computing device; and
transmitting, by the second client computing device, a notification response to the server.

12. A non-transitory computer-readable medium storing computer-executable instructions to implement a process of monitoring for and providing notification of application dialogs, the instructions comprising instructions to:
display user interface (UI) data from an application;
detect a dialog to display in the application, the dialog including information related to an idle session termination warning;
extract dialog details regarding the dialog from the UI data;
transmit the dialog details to a server;
receive a response to the dialog from the server; and
respond to the dialog based on the response to the dialog from the server;
wherein the instructions to detect the dialog comprise instructions to detect information related to operation of at least one user-initiated process being completed by the server; and
wherein the instructions to detect information related to the operation of the of at least one user-initiated process comprise instructions to detect a process configured to manipulate at least one resource so as to render one or more operations related to a distributed computing environment inaccessible to other users of the distributed computing environment until completion of the at least one user-initiated process.

13. The non-transitory computer-readable medium of claim 12, wherein the instructions to detect the dialog comprise instructions to identify changes in the UI data, the changes comprising changes in text to display in the application, changes in images to display in the application, a new window to display in the application, and/or one or more user-selectable response options to display in the application.

14. The non-transitory computer-readable medium of claim 12, wherein the instructions further comprise instructions to:
receive a notification from the server;
display at least a portion of the notification;
receive a response to the at least a portion of the notification from a user; and
transmit a notification response to the server.

15. The non-transitory computer-readable medium of claim 14, wherein the instructions further comprise instructions to:
receive the notification response from the server;
process the notification response to generate a processed notification; and
generate a response to the dialog based upon the processed notification.

16. A method of monitoring for and providing notification of application dialogs, the method comprising:
displaying, by a client computing device, user interface (UI) data from an application;
detecting, within the UI data by the client computing device, at least one dialog to display in the application, detecting the at least one dialog including detecting information related to an idle session termination warning;
extracting, by the client computing device, dialog details regarding the at least one dialog from the UI data
transmitting, by the client computing device, the dialog details to a server;
receiving, by the client computing device, a response to the dialog from the server; and
responding, by the client computing device, to the dialog based on the response to the dialog from the server;
wherein detecting the at least one dialog further comprises detecting information related to at least one or operation of at least one user-initiated process being completed by the server; and
wherein the method further comprises:
initiating the operation of the at least one user-initiated process, wherein the at least one user-initiated process comprises a process configured to manipulate at least one resource so as to render one or more operations relating to a distributed workspace inaccessible to other users of the distributed workspace until completion of the at least one user-initiated process.

* * * * *